(12) United States Patent
Rabaut et al.

(10) Patent No.: US 11,492,772 B2
(45) Date of Patent: Nov. 8, 2022

(54) DEVICE AND METHOD FOR PROVIDING A SIZEABLE, SLENDER OBJECT WITH A LONGITUDINAL DIRECTION INTO AN UNDERWATER BOTTOM

(71) Applicant: DEME Offshore BE NV, Zwijndrecht (BE)

(72) Inventors: Dieter Wim Rabaut, Ghent (BE); Kenneth Gerard Vannieuwenhuyse, Sint-Amandsberg (BE); Sven André Christiane De Bock, Melsele (BE)

(73) Assignee: DEME Offshore BE NV, Zwijndrecht (BE)

( * ) Notice: Subject to any disclaimer, the term of this patent is extended or adjusted under 35 U.S.C. 154(b) by 0 days.

(21) Appl. No.: 16/965,348

(22) PCT Filed: Jan. 29, 2019

(86) PCT No.: PCT/EP2019/052056
§ 371 (c)(1),
(2) Date: Jul. 28, 2020

(87) PCT Pub. No.: WO2019/149674
PCT Pub. Date: Aug. 8, 2019

(65) Prior Publication Data
US 2021/0123203 A1    Apr. 29, 2021

(30) Foreign Application Priority Data
Jan. 30, 2018   (EP) ..................................... 18154160

(51) Int. Cl.
*E02B 17/00*   (2006.01)
*F03D 13/25*   (2016.01)
(Continued)

(52) U.S. Cl.
CPC ............ *E02B 17/00* (2013.01); *B63B 35/003* (2013.01); *B63B 75/00* (2020.01); *E02D 7/00* (2013.01);
(Continued)

(58) Field of Classification Search
CPC combination set(s) only.
See application file for complete search history.

(56) References Cited

U.S. PATENT DOCUMENTS 10,167,852 B2 * 1/2019 Mulderij ............... E02D 27/425
11,008,726 B2   5/2021 Vehmeijer et al.
(Continued)

FOREIGN PATENT DOCUMENTS

| DE | 202009006507 U1 | 8/2009 |
|---|---|---|
| EP | 2886722 A1 | 6/2015 |

(Continued)

OTHER PUBLICATIONS

Brunner et al., "New Bauer Flydrill System Drilling Monopiles at Barrow Offshore Wind Farm, UK", 6th International Conference on Case Histories in Geotechnical Engineering, 2008, 10 pages.

*Primary Examiner* — Kyle Armstrong
(74) *Attorney, Agent, or Firm* — The Webb Law Firm

(57) ABSTRACT

Described is a device for providing a sizeable, slender object having a longitudinal direction into an underwater bottom from a deck of a vessel. The device includes a lifting means configured to take up the object at a lifting point thereof and position it on the underwater bottom; an upending tool connected to an edge of the vessel and configured to engage a first circumferential part of the object suspended from the lifting means and provide a pivot around which the object can be upended; and a gripping tool connected to an edge of the vessel and configured to engage a second circumferential part of the object suspended from the lifting means, whereby (Continued)

the first and second circumferential parts are optionally spaced apart in the longitudinal direction of the object. The gripping tool includes an actuator system configured to act on at least one of the upending tool and the gripping tool and control movements of at least one of the first and the second circumferential parts, relative to the vessel. A method using the device is also described.

19 Claims, 15 Drawing Sheets

(51) Int. Cl.
  *B63B 75/00*   (2020.01)
  *B63B 35/00*   (2020.01)
  *E02D 7/00*    (2006.01)
  *E02D 13/04*   (2006.01)
  *E02D 15/08*   (2006.01)
  *E02D 27/52*   (2006.01)
  *E02D 7/02*    (2006.01)

(52) U.S. Cl.
  CPC ............ *E02D 13/04* (2013.01); *E02D 15/08* (2013.01); *E02D 27/525* (2013.01); *F03D 13/25* (2016.05); *E02B 2017/0039* (2013.01); *E02B 2017/0065* (2013.01); *E02B 2017/0091* (2013.01); *E02D 7/02* (2013.01); *F05B 2240/95* (2013.01)

(56) References Cited

U.S. PATENT DOCUMENTS

| | | | |
|---|---|---|---|
| 2011/0236137 A1* | 9/2011 | Legaignoux | ............ F16L 1/207 |
| | | | 405/158 |
| 2017/0370068 A1* | 12/2017 | Mulderij | ................. E02D 27/42 |
| 2019/0211524 A1* | 7/2019 | Angelov | .................... E02D 7/14 |

FOREIGN PATENT DOCUMENTS

| | | |
|---|---|---|
| EP | 3559530 A1 | 10/2019 |
| JP | H412541 U | 1/1992 |
| JP | 200732017 A | 2/2007 |
| JP | 2007032017 A | 2/2007 |
| WO | 2017142418 A1 | 8/2017 |
| WO | 2018117846 A1 | 6/2018 |

* cited by examiner

DEVICE AND METHOD FOR PROVIDING A SIZEABLE, SLENDER OBJECT WITH A LONGITUDINAL DIRECTION INTO AN UNDERWATER BOTTOM

CROSS-REFERENCE TO RELATED APPLICATIONS

This application is the United States national phase of International Application No. PCT/EP2019/052056 filed Jan. 29, 2019, and claims priority to European Patent Application No. 18154160.8 filed Jan. 30, 2018, the disclosures of which are hereby incorporated by reference in their entirety.

BACKGROUND OF THE INVENTION

Field of the Invention

The invention relates to a device and method for providing a sizeable, slender object with a longitudinal direction into an underwater bottom from a deck of a vessel. The invention relates particularly to a device and method for providing a monopile of a wind turbine into an underwater bottom from a deck of a vessel, in particular a floating vessel.

Description of Related Art

The invention will be elucidated with reference to an offshore wind turbine. The reference to such a wind turbine does not however imply that the invention is limited thereto, and the device and method could be applied for providing into an underwater bottom any other sizeable slender object, such as for instance other offshore foundation structures, jetties, radar and other towers, and the like.

The foundation of a wind turbine at sea generally has a slender design because the height difference with an underwater bottom has to be bridged. A frequently applied foundation of a wind turbine comprises a monopile provided on an upper side with a transition piece which forms the connection to a turbine mast arranged on the monopile. The monopile is carried under water and a lower end driven into an underwater bottom. A large part of the monopile foundation is thus located under water in use.

Monopiles typically comprise hollow cylindrical structures of steel or concrete which can have a length of up to and more than 100 m, a diameter of up to 11 m and more, and a weight which can rise up to 2000 tons and more. Moreover, foundations for wind turbines are becoming increasingly heavier and larger because wind turbines are constantly scaled up to produce more electrical energy. The increasingly more sizable monopile foundations make them increasingly more difficult to handle.

A known method for providing a monopile on an underwater bottom comprises taking up the monopile from a vessel using a lifting means such as a crane and lowering the monopile onto or into the underwater bottom, the monopile being kept under control here in a roughly vertically oriented position by a pile gripper connected to the vessel. The vessel is typically a jack-up vessel, since the legs of the jack-up vessel provide the required stability. In a typical operational sequence, the monopile is lowered to the seabed by the lifting means using the pile gripper. When load is transferred from the lifting means to the seabed, the monopile is decoupled from the lifting means and a driving hammering tool is installed onto the monopile. Under some guidance provided by the pile gripper, the monopile is driven into the seabed further until the desired depth is reached. Only after the monopile has been fixed in the seabed, the monopile is decoupled from the pile gripper.

The article "New BAUER Fly Drill System Drilling Monopiles at Barrow Offshore Wind Farm, UK" by Manfred Beyer et al. discloses a device for placing a monopile of a wind turbine in an underwater bed. Use is made of an upending and guidance system comprising an upending tool or frame, and a gripping tool disposed thereunder. The system is connected to the stern of the ship and forms a hinge around which the monopile can rotate during upending.

WO 2017/142418 A1 discloses a device for depositing a complete mono-column platform in the seabed. The platform is supplied over water by a first vessel and a pontoon arranged behind and connected to the vessel by cables. The pontoon is removed from under the platform which allows the platform to rotate into the water under the influence of its own weight and using traction cables. The first vessel is equipped with a guiding device for the platform offering a number of degrees of freedom by moving together with the platform when the latter is suspended in the water.

The use of a jack up vessel ensures that the motion of the vessel is limited, but has some disadvantages and limitations, for instance related to height and size. To be able to install larger and heavier monopiles, installation of monopiles from floating vessels is expected to be required.

The known pile grippers, used on jack-up platforms, are not usable on floating vessels, since a stable and static work platform is lacking on a floating vessel. A floating vessel further has a relatively large footprint, even when its position is restricted somewhat by a dynamic positioning (DP) and/or mooring system. Another drawback of the known method and device is that it can only be performed in a relatively calm sea, and for relatively small object sizes. A sizeable object is indeed subject to a great deal of energy from the sea (currents, waves) and from the wind as it is lowered into the water. The heavier the sea state, the more difficult it becomes to keep a sizeable object such as the increasingly larger monopiles under control. With such a weather restrain, precious time may be lost.

SUMMARY OF THE INVENTION

An object of the present invention is therefore to provide a device and method for providing a sizeable, slender object with a longitudinal direction into an underwater bottom, which at least partially obviates the above stated drawbacks of the prior art. The invention particularly seeks to provide an improved device and method for safely providing a monopile of a wind turbine into an underwater bottom from a floating vessel.

Provided for this purpose according to the invention is a device for providing a sizeable, slender object having a longitudinal direction into an underwater bottom from a deck of a vessel, the device comprising:
 a lifting means configured to take up the object at a lifting point thereof and position it on the underwater bottom;
 an upending tool connected to an edge of the vessel and configured to engage a first circumferential part and support the object in the longitudinal direction when suspended from the lifting means, thereby providing a pivot around which the object can be upended; and
 a gripping tool connected to an edge of the vessel and configured to engage a second circumferential part of the object suspended from the lifting means, whereby the first and second circumferential parts are optionally spaced apart in the longitudinal direction of the object; and an actuator system configured to act on at least one of the upending tool and the gripping tool and control movements of at least one of the first and the second circumferential parts, relative to the vessel.

None of the cited prior art documents, and in particular WO 2017/142418 A1, shows an actuator system which is adapted to engage with the upending frame and/or with the gripping tool to dampen or control movements of the first and/or second circumferential parts relative to the vessel. At best, WO 2017/142418 A1 discloses a system that is arranged to move together with a platform engaged with the system and suspended in the water. The known system is not able to act on the suspended platform, for instance by dampening the movements of the platform engaged with the system (passive compensation), or by actively impose movements onto the platform (active compensation).

According to an embodiment of the invention, the first and a second circumferential parts may substantially coincide. In such an embodiment, the upending tool and the gripping tool are positionally aligned such that they act upon a substantially same circumferential part of the object. In another embodiment, the gripping tool may be configured to function as an upending tool. To this end, the gripping tool is connected to an edge of the vessel and is configured to support the object in the longitudinal direction when suspended from the lifting means, thereby providing a pivot around which the object can be upended.

According to yet another embodiment of the invention, the upending tool and the gripping tool are positionally aligned with respect to each other such that they allow engaging a first and a second circumferential part that are spaced apart in the longitudinal direction of the object. This has several advantages as will be elucidated further below.

The actuator system may be operated in different modes depending on the phase in which it is operated. In a typical method, the object is taken up with a lifting means at a lifting point thereof, and brought into the upending tool, which engages a first circumferential part of the object. The object may then be upended to a substantially vertical position, while the upending tool is rotated around a pivot. During this phase of the operations, the actuator system is typically configured to act on the upending tool and control movements of the first circumferential part relative to the vessel by damping these movements. In this phase of the operations, the actuator system is said to operate in a passive mode. Damping of the movement of the first circumferential part relative to the vessel allows a more controlled and safe operation.

When the object has been upended to a substantially vertical position, a typical further step then includes engaging a second circumferential part of the object suspended from the lifting means with the gripping tool and lowering the object onto and into the underwater bottom. In this phase of the operations, the actuator system is typically configured to act on the gripping tool and limit movements of the second circumferential part relative to the vessel by damping these movements passively, or if required, by actively imposing movements onto the second circumferential part relative to the vessel. In another embodiment, the actuator system is also configured to act on the upending tool and control movements of the first circumferential part relative to the vessel by actively imposing movements onto the first circumferential part relative to the vessel. The actuator system may in yet another embodiment be configured to act simultaneously on both the upending tool and the gripping tool to control movements of the first and second circumferential parts relative to the vessel by actively imposing movements onto the first and second circumferential parts relative to the vessel.

A particularly preferred embodiment of the invention relates to a device wherein the gripping tool comprises an actuator system configured to translate the second circumferential part of the upended object relative to the vessel in a substantially horizontal plane, thereby compensating for vessel and object motions in said plane.

The device and more specifically the combination of the upending tool and the gripping tool provides a reliable system for controllably and accurately providing the object to and into the underwater bottom, preferably from a floating vessel. The combination of the mutually aligned upending and gripping tool allows reducing swinging motions of the object, in particular when depending from a lifting means, such as a crane. A crane indeed is subject to certain acceptable limitations. For instance, typical maximum allowable inclination angle values of the hanging wire are 5° off lead and 3° side lead. Exceeding such limits may cause a hanging wire to run out of the crane sheaves, and/or may cause exceeding the maximum allowable horizontal load capacity of the crane. It is particularly useful to prevent 'overswinging' of the object when partly upended in the upending process, for instance to an inclination angle of about 80° with respect to the horizontal direction.

The invented device may absorb at least some of the energy of an object suspended from the lifting means and is configured to keep an upended object in a desired position relative to the underwater bottom while the object is lowered onto the underwater bottom of provided into said underwater bottom.

One of the main challenges in floating monopile installation is to install the pile within the required installation tolerances. A floating (and therefore moving) vessel indeed has a very limited workability range or will not even be able to cope with the tight tolerances typically required. As an example, the maximum deviation of the angle of the monopile with respect to the vertical direction may be limited to within 0.25° for some projects. The device of the invention helps in achieving such goals.

The lifting point preferably comprises an upper end of the object, and at least one of the upending tool and the gripping tool is configured to engage the object suspended from the lifting means at a distance from the lifting point.

Another aspect of the invention relates to a method for providing a sizeable, slender object having a longitudinal direction into an underwater bottom from a deck of a vessel, the method comprising the steps of a) providing an object and a device according to any one of the preceding claims;

b) taking up the object with the lifting means at a lifting point thereof;

c) bringing the object inside the upending tool and engaging a first circumferential part and a lower end of the object, optionally suspended from the lifting means, with the upending tool;

d) upending the object to a substantially vertical position, while the upending tool is rotated around a pivot;

e) engaging a second circumferential part of the object suspended from the lifting means with the gripping tool, whereby the first and second circumferential parts are optionally spaced apart in the longitudinal direction of the object, f) lowering the object onto and into the underwater bottom; and g) decoupling the object from the device.

wherein the actuator system acts on at least one of the upending tool and the gripping tool and controls movements of at least one of the first and the second circumferential parts, relative to the vessel during at least one of steps d) and f).

It is noted that the above method steps do not require a specific sequence. It is in particular possible that the step e) of engaging a second circumferential part of the object suspended from the lifting means with the gripping tool, is performed before or together with a part of step d), i.e. upending the object to a substantially vertical position, while the upending tool is rotated around a pivot.

With substantially is understood a deviation of at most 20%, more preferably at most 10%, still more preferably at most 5% and most preferably at most 0.5% of the indicated quantity.

An embodiment of the invention relates to a device and method in which the actuator system is configured to damp the movements of at least one of the engaged first and the second circumferential parts, relative to the vessel, at least during one of steps d) and f). Particularly preferred is a device and method wherein the actuator system is configured to damp the movements relative to the vessel of both of the engaged first and the second circumferential parts, at least during one of steps d) and f). Such embodiments further prevent or at least limit rotation of the object during upending around a vertical axis of the upending tool, for instance when a lower end of the object is moving in the vessel surge direction. They may also prevent or at least limit a sudden tip over of an upper end of the object when the object is nearly in a vertical position, for instance when a lower end of the object is moving in the vessel sway direction.

During upending or while the object is being lowered, a second circumferential part of the object is engaged by the gripping tool. The gripping tool can be operated in a damping mode in which the object can move in a transverse direction relative to its longitudinal direction in the manner of a damped pendulum. It may also be possible to use the gripping tool and the upending tool in combination to create rotational damping. The upending tool is then used as a damped hinge point for the first circumferential part while the gripping tool damps the transverse movements of the second circumferential part.

In the damping mode, at least one of the upending tool and the gripping tool—and preferably both—avoid these movements reaching such high amplitudes that the device and/or the object, and/or the lifting means may be damaged.

Also, a better controlled operation may be obtained by removing peak amplitudes. It thus becomes possible to work in a heavier sea state of up to 2-2.5 m of significant wave height and more, where a prior art method can only be applied up to a significant wave height of 1.5 m. The gripping tool can also be operated in a vessel motion compensating mode, in which mode the second circumferential part of the upended object is held in a substantially fixed position relative to the underwater bottom in a plane extending parallel to the underwater bottom, notwithstanding movements of the vessel relative to the underwater bottom. This mode is preferably used just before the upended object has been lowered to such extent that the underwater bottom is touched or partly penetrated.

In operation, at least one of the upending tool and the gripping tool is brought outboard, such that the engaged first and/or second circumferential parts extend beyond the edge of the vessel. The upended object suspended from the lifting means then hangs downward along the edge of the vessel into or above the water.

A further embodiment of the invention provides a device wherein step f) further comprises lowering the object onto and into the underwater bottom while translating the second circumferential part of the upended object relative to the vessel in a substantially horizontal plane, thereby compensating for vessel motions.

Another embodiment of the invention relates to a device wherein the actuator system is configured to hold the second circumferential part of the upended object in a substantially fixed position relative to the underwater bottom in a horizontal plane, i.e. in a plane extending substantially parallel to the underwater bottom. A horizontal plane is defined to extend substantially parallel to the underwater bottom, or alternatively to the water surface.

A vessel when floating on water is subjected to movements exhibiting 6 degrees of freedom, including three translational movements and three rotational movements. In a Cartesian coordinate system linked to a vessel, and defining the z-axis as extending vertically, the x-axis as extending in a longitudinal direction of the vessel and the y-axis as extending in a transverse direction of the vessel, an x-axis translational movement is referred to in the art as surge, a y-axis translational movement as sway, and a z-axis translational movement as heave. A rotational movement of the vessel around the x-axis is referred to as roll, a rotation around the y-axis as pitch, and a rotation of the vessel around the z-axis as yaw. Notably, the (x,y)-plane formed by the deck of the vessel will not be parallel to a plane extending parallel to the underwater bottom motion, due precisely to the vessel's motion on the water. The actuator system of the invented device is able to translate the second circumferential part of the upended object relative to the vessel in a substantially horizontal plane, thereby compensating for vessel motions, and, in an embodiment, hold an object, and in particular a circumferential part of the upended object, in a substantially fixed position relative to the underwater bottom in a horizontal plane, i.e. a plane extending about parallel to the underwater bottom. This means that, in a Cartesian coordinate system linked to the gripping tool, having (x, y, z)-axes extending parallel to the (x, y, z)-coordinate axes of the vessel's coordinate system, there is no movement relative to the underwater bottom in the x and y directions of the gripping tool coordinate system.

Holding an object in a substantially fixed position relative to the underwater bottom in a horizontal plane may be achieved in an embodiment of the invented device wherein the actuator system is configured to translate the gripping tool relative to the vessel in a plane extending parallel to the underwater bottom. The actuator system may be controlled by an operator from the vessel bridge or deck control room of the vessel for instance to achieve the above goal at least to some degree of accuracy.

A further improvement of the invention interfaces the gripper tool and dynamic positioning/mooring system controllers. An embodiment of such interface comprises a force feedforward loop from the gripper tool to the DP controller. An improved embodiment of the invention provides a device further comprising a sensor system configured to measure an inclination of the upended object relative to a vertical axis. Such an embodiment allows an operator to take the appropriate action in response to the sensor system output. He may for instance translate the gripping tool relative to the vessel to accommodate a deviation from verticality of the object. In an aspect of the invention the angular position of the object is adjusted by actively moving the gripping tool or parts thereof by means of the actuator system, or by actively moving the position of the vessel, either by operating its DP system or its mooring system. The latter systems are particularly useful for correcting relatively large offsets. An object arranged on the underwater bottom can thus be brought into the correct, generally vertical position before this object is fixed in the underwater bottom. The angular position is determined by the angle which the longitudinal direction of the object makes with the vertical direction.

A further improved device according to an embodiment of the invention in addition comprises a control system configured to generate control signals for the actuator system in response to the sensor system output. Such an embodiment does not need the intervention of an operator and can operate on its own, if desired.

The position of a slender object such as a monopile installed in an underwater bottom may be determined by any means known in the art, such as by a global positioning system, known per se. Accurate positioning of the object may be enhanced by an embodiment of the invented device in which the vessel comprises a dynamic positioning (DP) or mooring system. Such systems allow keeping a vessel in a relatively constant position relative to the underwater bottom, at least within some tolerances, without using spud poles, as in a jack-up platform for instance. The mooring system may comprise a number of mooring lines, provided at one end with a suitable means for connecting to the underwater bottom, and at another end provided around a winch or other suitable taking in/paying out means. The number of mooring lines may be chosen conveniently between one and any number, for instance 2, 3, 4, 5, 6, 7, 8, 9, 10, or even more.

A practical embodiment of the gripping tool according to the invention comprises a gripping unit for engaging the second circumferential part and a support frame for the gripping unit, wherein the support frame is connected to the edge of the vessel. The support frame connects the gripping unit to the vessel and in some embodiments allows the actuator system to translate the gripping unit relative to the vessel in a plane extending parallel to the underwater bottom.

In another useful embodiment of the device at least one of the upending tool and the gripping tool is pivotably connected to the edge of the vessel around an axis extending along the edge for bringing the tool inboard and outboard of the vessel. Advantageously, both the upending tool and the gripping tool are pivotably connected to the edge of the vessel around an axis extending along the edge.

In order to facilitate moving the gripping unit in a horizontal plane, an embodiment of the device comprises a gripping tool pivotably connected to the edge of the vessel around an axis extending perpendicular to the deck of the vessel. Such an axis extends in a substantially vertical direction.

Another embodiment of the invention relates to a device wherein the actuator system comprises piston cylinder units acting between the vessel and at least one of the upending tool and the gripping tool, preferably hydraulic piston cylinder units. In order to be able to control movement of the upending and/or gripping tool in a horizontal plane, the piston cylinder units preferably extend or shorten in a horizontal plane to adjust the horizontal position of the second circumferential part of the object in the (x, y)-plane relative to the vessel. The actuator system primarily compensates for all horizontal vessel motions during use. These include first order motions related to the motions of the vessel itself, such as surge, sway, roll, pitch and yaw induced horizontal motions. Indeed, rotary movements of the vessel such as roll, may cause a horizontal or vertical translation component of the gripping tool.

Second order motions may also be compensated by the actuator system of the gripping tool, or alternatively by a dynamic positioning (DP) or mooring footprint, in case these second order motions surpass the compensating boundaries of the gripping tool actuator system. A combination of both may also be used.

All vertical motions of the vessel are released (allowed). These include heave, roll and pitch induced vertical motions of the vessel. These, accordingly, are not transmitted to the gripping tool.

The vessel yaw around the object (rotation point) may be compensated as well or, in an alternative embodiment may be released. This is to avoid applying a torque by the vessel on the object.

It may be beneficial, in particular when the object has in use not reached the underwater bottom yet, to provide an embodiment of the device wherein the actuator system comprises movement-damping means configured to damp movements of the gripping tool and of an object held by the gripping tool relative to the vessel. A preferred embodiment provides movement-damping means in the form of a piston cylinder unit and throttle means for hydraulic liquid present in the piston cylinder unit. A practical embodiment provides an actuator system, the piston cylinder units whereof are also configured as movement-damping means. In such embodiment, the actuator system acts as an accurate positioning system and as movement-damping means.

The movement-damping means may be configured to convert the kinetic energy of the gripping members (and an object received therein) moving relative to the support structure to thermal energy. The temperature increase resulting from the generated heat can for instance be kept under control by cooling of conduits and the like in the ambient air. In a possible embodiment the device comprises cooling means for the movement-damping means or components thereof.

The throttle means for hydraulic liquid may be present in the piston cylinder. Flowing hydraulic liquid is subjected by the throttle means to a hydraulic resistance, whereby the friction increases and the temperature rises. Generated kinetic energy is thus dissipated effectively. This embodiment may when desired be applied in combination with a hydraulic accumulator which can optionally generate desired pre-stressing forces and/or can compensate possible volume differences in hydraulic cylinder chambers. Pre-stressing of the piston cylinder units of the actuator system may be controlled in a simple manner by applying an accumulator. Suitable accumulators comprise membrane accumulators and/or piston accumulators. In the case of a transverse movement of the monopile and the gripping tool or parts thereof, the counteracting stress in such a movement-damping connection will increase to a value which depends on the gas volume in the accumulator, whereby the movement is countered.

The throttle means can be embodied as openings in the piston of the piston cylinder and/or as constrictions in the hydraulic conduits. Suitable throttle means for instance comprise optionally controllable throttle valves.

According to the invention the actuator system and its components such as the optional movement-damping means act transversely of the longitudinal direction of the object. This means that swinging movements transversely of the longitudinal direction of an object received in the upending and/or gripping tool are counteracted with a force component acting transversely of the longitudinal direction of the object.

Another embodiment provides a device wherein at least one of the upending tool and the gripping tool comprises an openable and re-closable ring structure provided around the first and/or second circumferential part of the object respectively.

The ring structure is preferably provided with a plurality of guiding arms, extending in a transverse plane about perpendicular to the longitudinal direction of the object, and movable in the transverse plane between a retracted position at a distance from the circumferential part, and an extended position in which the circumferential part is engaged.

A more preferred embodiment provides a device wherein the plurality of guiding arms is configured to allow at least one of a translation in the longitudinal direction of the object and a rotation around an axis parallel to the longitudinal direction of the object. A translation in the longitudinal direction of an upended object corresponds to a substantially vertical translation and therefore allows accommodating heave of the vessel. A rotation around the longitudinal direction of an upended object corresponds to a rotation around a substantially vertical axis and therefore allows accommodating yaw of the vessel. The latter rotation allows rotating an upended object such as a monopile around the vertical axis just before it is fixed into the underwater bottom.

The upending tool according to an embodiment of the invention may comprise two interconnected ring structures spaced apart in the longitudinal direction of the object, to form a cage-like structure that is preferably openable to receive the object. The ring structures may be interconnected by longitudinally extending ribs for instance.

According to the invention, the upending tool is configured to support the object in the longitudinal direction when suspended from the lifting means. This may be achieved in an embodiment by providing the upending tool with one or more telescopically extendable arms provided with a hook that engages a lower end of the object. The telescopically extendable arms allow adjusting the longitudinal distance between the lower end and the first circumferential part of the slender object, thereby offering the possibility of accommodating different object sizes. A single arm is typically positioned between a lower end of the object and a vessel's side shell.

As an alternative to the above mentioned arms with hooks, the object may also be clamped on friction during upending, for instance by providing the upending tool with frictional elements that prevent an engaged first circumferential part from sliding downwards relative to the upending tool. An upending tool comprising frictional elements may even be used as a lifting means, in which embodiment a separate lifting means such as a crane may be omitted. Suitable frictional elements may comprise rubber tracks for instance.

The upended object when brought down towards the underwater bottom and finally contacting said bottom may then further penetrate said bottom under the influence of its own weight. A preferred embodiment of the invention however further comprises means for driving the object into the underwater bottom. It is thus possible to drive the monopile into the bottom surface by making use of a per se known hydraulic hammering unit, by drilling or by another suitable technique. In a preferred method the object is supported by the gripping tool while the object is being driven into the underwater bottom.

Another further improved device according to the invention comprises a gripping tool equipped with a noise mitigation system (NMS). This embodiment may be useful in circumstances where it is mandatory to reduce noise pollution during driving the object into the underwater bottom. The gripping tool is provided with an appropriate interface to allow using such a NMS. Although an embodiment in which the NMS is connected to the gripping tool is preferred, the NMS may also be provided as a separate structure to be brought into the water nearby the gripping unit. When connected to the gripping tool, the NMS is preferably openable in order to allow an object to enter the gripping tool and NMS.

The device is particularly useful for providing a monopile foundation into an underwater bottom from a deck of a vessel, preferably a floating vessel, according to methods as elucidated in the appended claims.

It is expressly stated that the embodiments of the invention described in this patent application can be combined in any possible combination of these embodiments, and that each embodiment can individually form the subject-matter of a divisional patent application.

BRIEF DESCRIPTION OF THE DRAWINGS

The invention will now be elucidated with reference to the following figures, without otherwise being limited thereto. In the figures.

DESCRIPTION OF THE INVENTION

Figure 1:
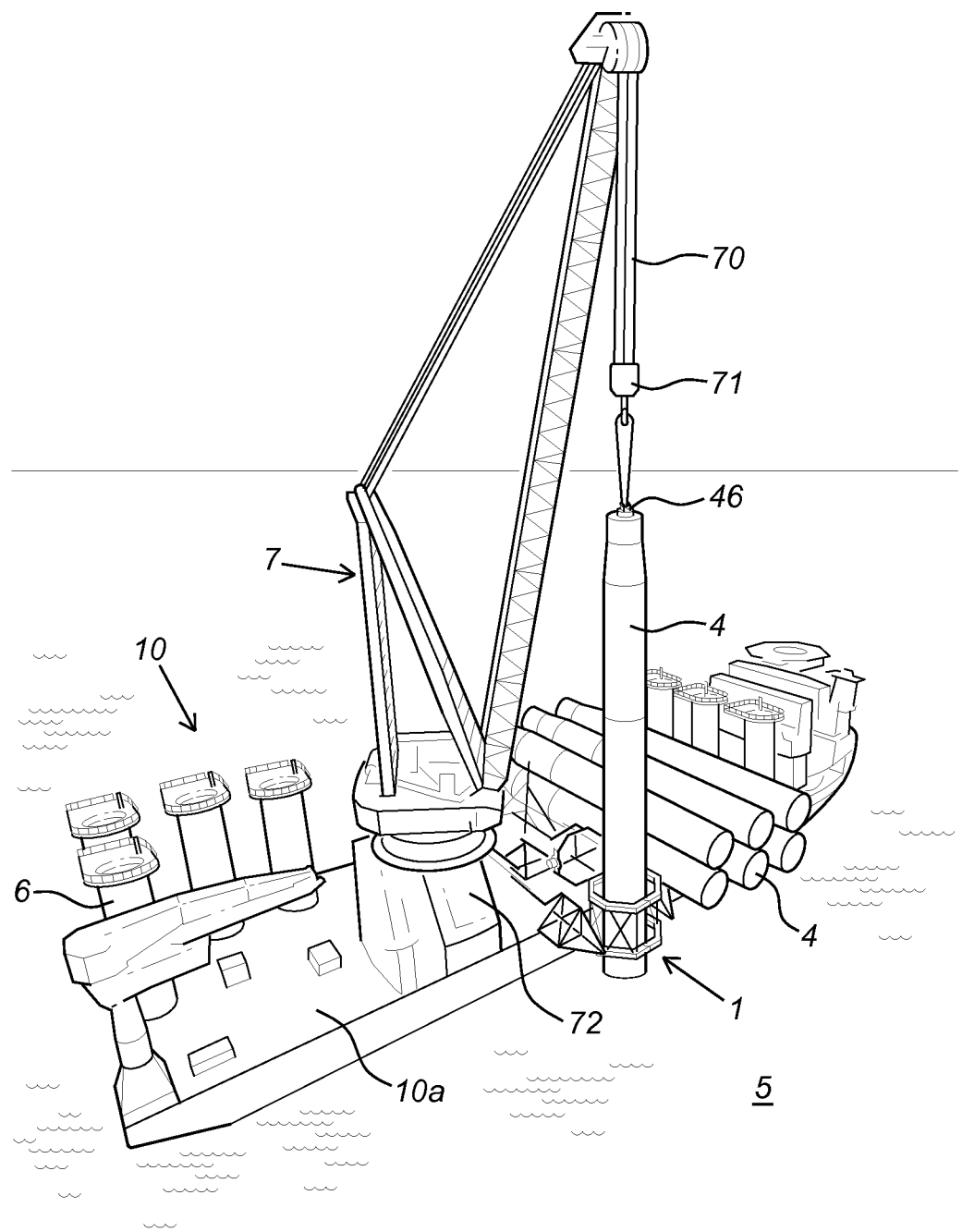
FIG. 1 is a schematic perspective view of a floating vessel provided with a device according to an embodiment of the invention.

Referring to FIG. 1 a vessel 10 is shown that is equipped with a device 1 according to an embodiment of the invention. The device 1 is used for providing a monopile 4 having a longitudinal axis 40 into a bottom under water 5. Components to be placed may be provided on a work deck of the vessel 10, such as for instance a number of transition pieces 6 and monopiles 4. The work deck of the vessel 10 further supports a lifting means in the form of a crane 7, pivotably provided around a vertical axis on a base 72. The crane 7 is provided with hoisting cables 70 and, at a free outer end thereof, with a hoisting block 71 with hook, from which a monopile 4 may be suspended in use at a lifting point 46, provided at an upper end of the monopile 4.

The vessel 10 is equipped with a dynamic positioning and/or mooring system (not shown), known per se.

Figure 2:
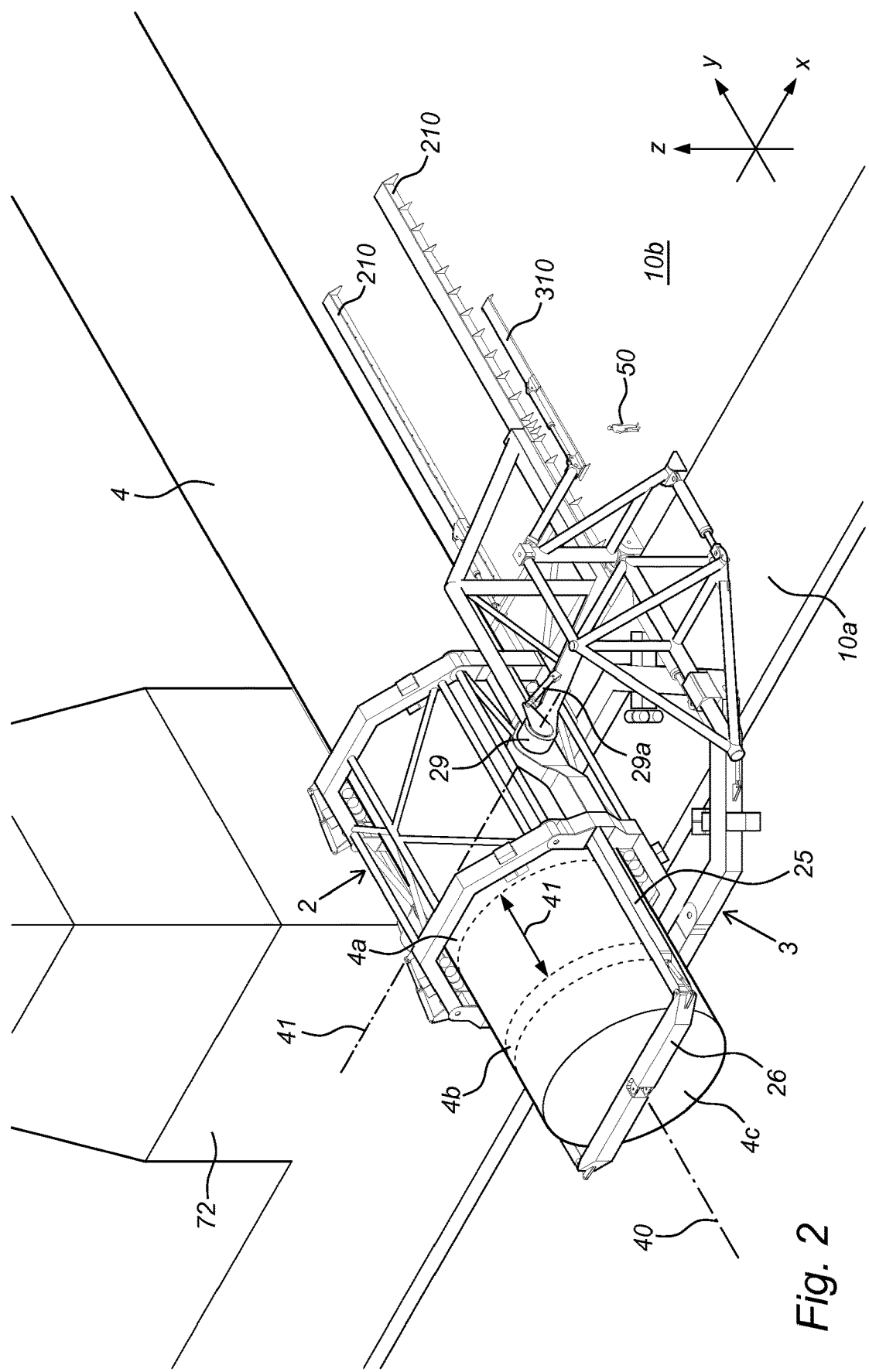
FIG. 2 is a schematic perspective view of a device comprising an upending tool and a gripping unit in accordance with an embodiment of the invention.

An embodiment of the device 1 is shown in more detail in FIG. 2. The device 1 comprises an upending tool 2 connected to an edge 10a of the vessel 10 and configured to engage a first circumferential part 4a and support a lower end 4c of the monopile 4. The upending tool 2 provides a pivot around which the monopile 4 may be upended, as will be described in more detail below. The device 1 also comprises a gripping tool 3, also connected to the edge 10a of the vessel 10. The gripping tool 3 is configured to engage a second circumferential part 4b of the monopile 4, as shown in FIGS. 6E to 6M. As shown, first circumferential part 4a and second circumferential part 4b are spaced apart in the longitudinal direction 40 of the monopile 4 over some distance 41. The first and second circumferential parts (4a, 4b) are located at a non-zero distance from the lifting point 46.

The gripping tool 3 comprises an actuator system comprising a number of hydraulic piston cylinders 35 (see FIG. 4), configured to translate the second circumferential part 4b of a monopile 4 in upended position relative to the vessel 10 in a substantially horizontal plane. Motions of the vessel 10 as a result from wave action are thereby compensated, as illustrated more in detail below.

A pair of skidding rails (210, 310) is provided on the work deck 10b of the vessel 10. Skidding rails 210 are used for translating the upending tool 2 in a transverse (athwartship) direction parallel to a y-axis in a (x, y) coordinate system associated with the vessel 10, for bringing the upending tool from an outboard position shown in FIGS. 6A to 6I, to an inboard position shown in FIGS. 6K to 6O. Skidding rails 310 are used for rotating the gripping tool 3 around a vessel's x-axis extending parallel to the edge 10a of the vessel 10 for bringing the gripping tool 3 from an outboard position shown in FIG. 4B for instance, to an inboard position shown in FIG. 4C. The x-axis in the vessel's coordinate system extends parallel to the amidship direction of the vessel 10.

A person 50, standing on the work deck 10b of the vessel 10 illustrates the size of the device 1.

The device 1 allows straight piling from the floating vessel 10. The upending tool 2 is configured for upending of the monopile 4, bringing it from a substantially horizontal transport position (as shown in FIG. 1) to a substantially vertical orientation. The upending tool 2 is in the embodiment shown placed in line with the gripping tool 3 and works together with the gripping tool 3 in keeping the monopile 4 under control and prevent oscillations of the monopile 4 during lowering. The upending tool 2 and gripping tool 3 work are aligned in the longitudinal direction 40 of the monopile to be received in both tools (2, 3). However, both tools (2, 3) may also be used out of line if desired.

Figure 3A:
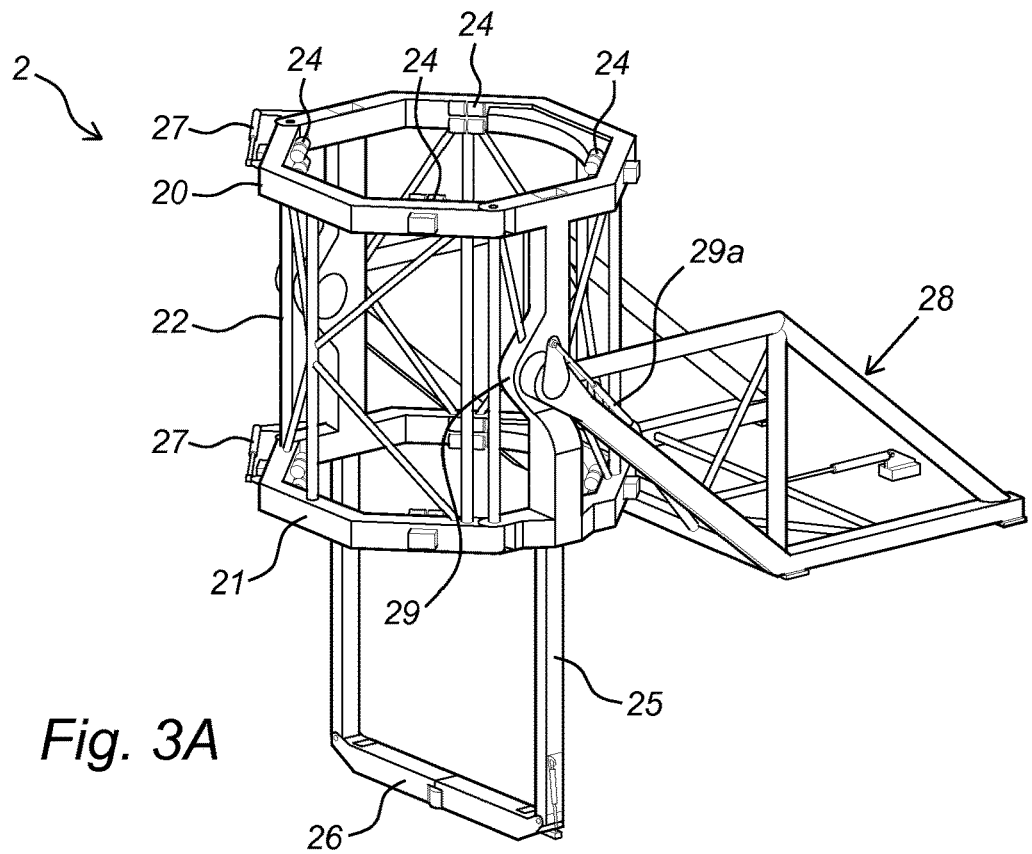
FIG. 3A-3F represent schematic perspective views of the embodiment of FIG. 2 during different stages of operation.
Figure 3B:
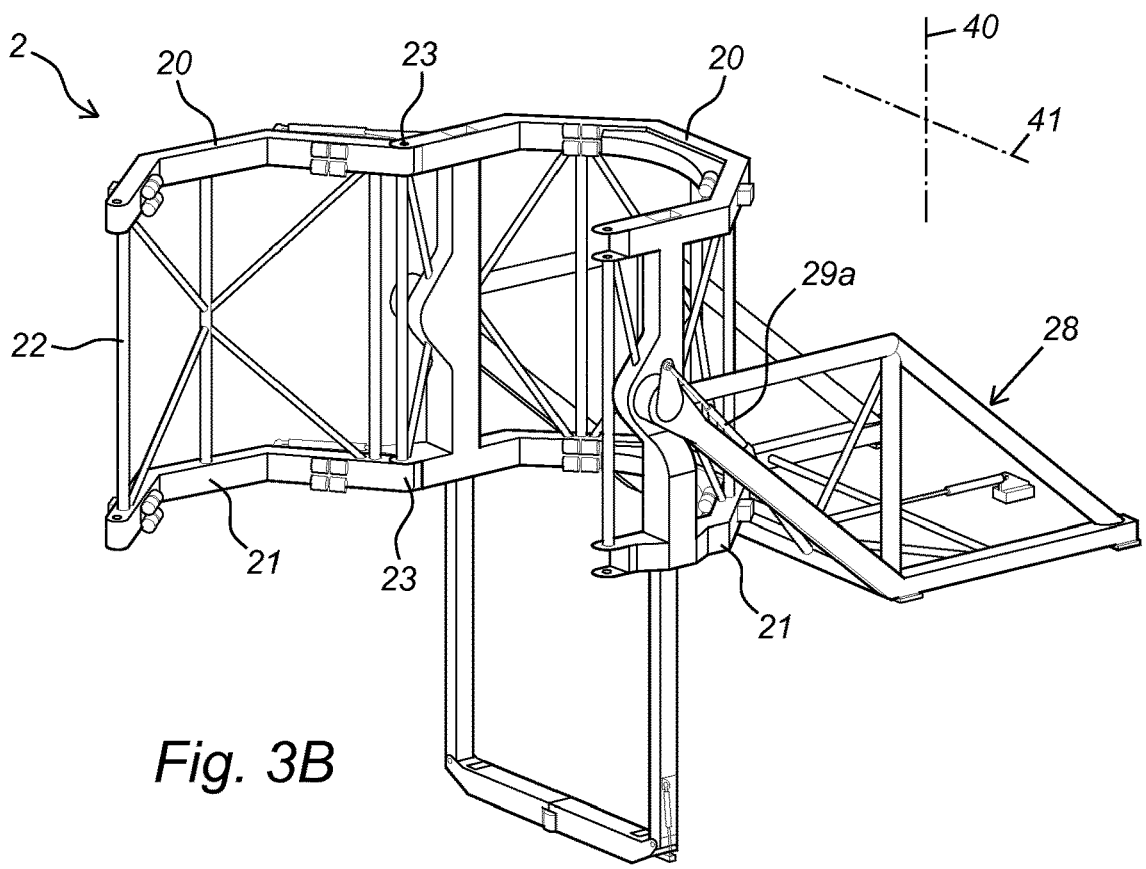

Referring to FIGS. 3A to 3F, the upending tool 2 has two interconnected ring structures (20, 21) spaced apart in the longitudinal direction 40 of the monopile 4 when received in the upending tool 2. The rings (20, 21) are interconnected by longitudinal ribs 22 and together form a cage-like structure, in which a monopile 4 may be received. The ring structures (20, 21) are openable and re-closable by rotating around hinges 23 as shown in FIG. 3B for instance. The monopile 4 may be loaded and released from the upending cage-like structure (20, 21, 22) by opening the cage door with hydraulic cylinders 27 provided for this purpose. Locking cylinders may be used to constrain the cage-like structure door during upending.

The upending cage-like structure (20, 21, 22) is supported by a hang-off frame 28 that is slidable along the skidding rails 210. The cage-like structure (20, 21, 22) is connected to the hang-off frame 28 by a hinge 29 that allows a free rotation around an axis 41, extending transversely to the longitudinal direction 40 of the monopile 4 when received in the upending tool 2. The hang-off frame 28 can be moved inboard by the skidding system 210 and is locked in place by locking pins operated by (low capacity) hydraulic cylinders. Rotation of the upending frame 2 around the hinge 29 and relative to the vessel (or hang-off frame 28) is driven by a pair of hydraulic cylinders 29a arranged on each side of the cage-like structure (20, 21, 22) between the hang-off frame 28 and a yoke provided on the hinge 29. The hydraulic cylinders 29a are part of a hydraulic circuit comprising the actuator system. When the monopile 4 is upended to a substantially vertical position, the upending tool 2 is rotated around the pivot 29. During this phase of the operations, the actuator system is typically configured to act on the upending tool 2 and control movements of the engaged monopile 4 relative to the vessel 10 by damping these movements. In this phase of the operations, the actuator system is said to operate in a passive mode. In another embodiment, also active control is possible.

Figure 5:
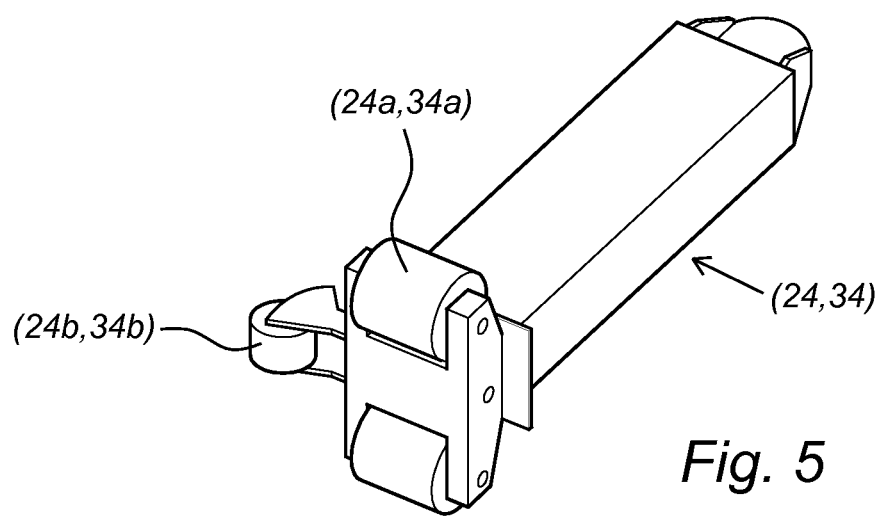
FIG. 5 is a schematic perspective view of a distance holding element, used in the gripping construction according to an embodiment of the invention; and finally FIG. 6A-6O schematically represent different stages of operation in accordance with an embodiment of the invented method.

The cage-like structure (20, 21, 22) is provided around the first circumferential part 4a of the monopile 4 to hold it. The ring structures (20, 21) are thereto provided with a plurality of guiding arms 24, extending in a transverse plane about perpendicular to the longitudinal direction 40 of a monopile 4 provided in the cage-like structure (20, 21, 22). The guiding arms 24, a detailed view of which is shown in FIG. 5, are movable in the transverse plane between a retracted position at a distance from the circumferential part 4a, and an extended position in which the circumferential part 4a is engaged. At the engagement end of the guiding arms 24, the arms are provided with rollers 24a that in use allow a relatively unhindered movement of the engaged monopile 4 in a z-direction (a vertical direction corresponding to heave of the vessel 10), and rollers 24b that in use allow a relatively unhindered rotation of the engaged monopile 4 around an axis parallel to the longitudinal direction 40 of the monopile 4, corresponding to sway of the vessel 10.

Figure 3C:
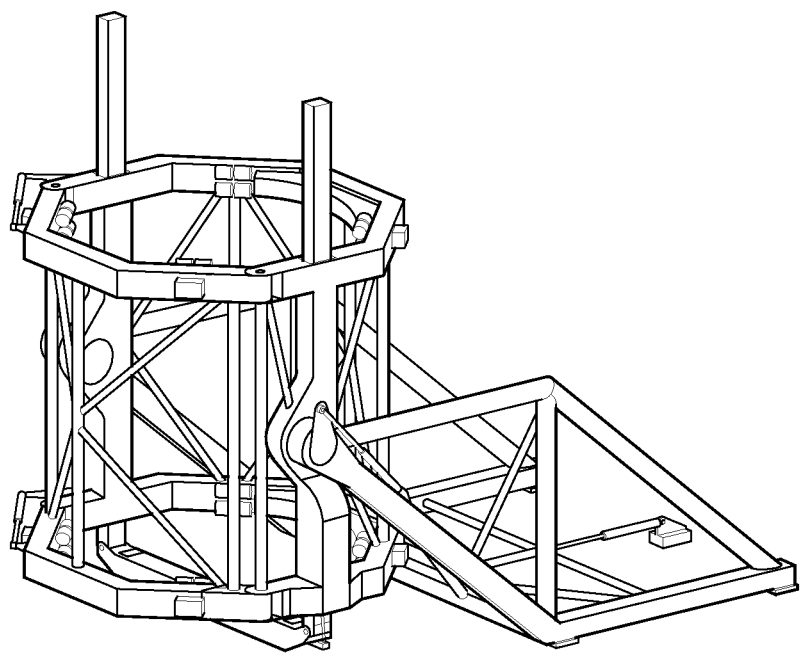
Figure 3D:
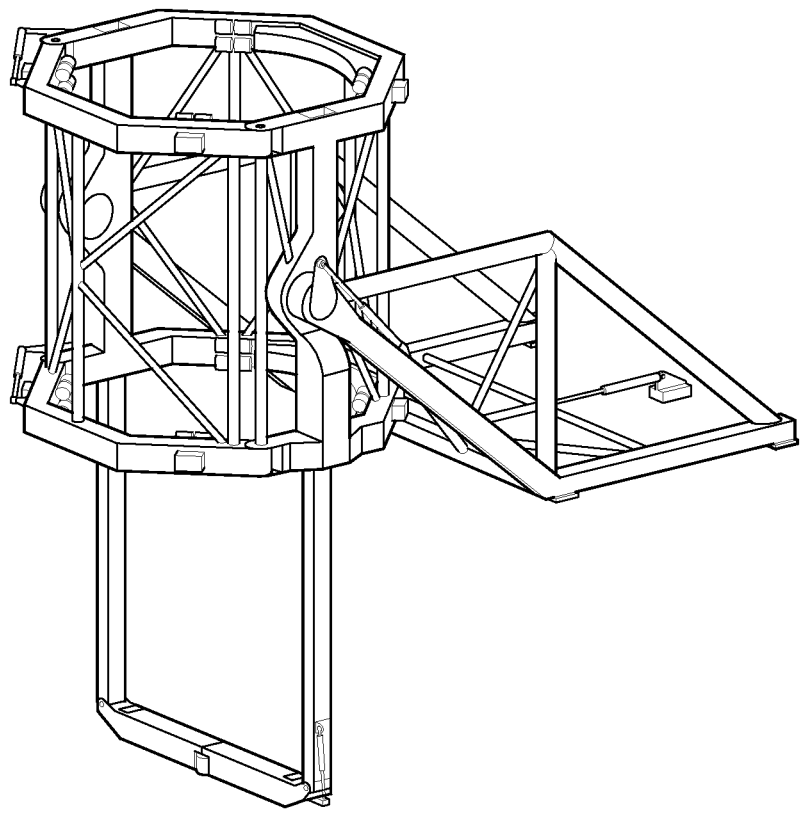
Figure 3E:
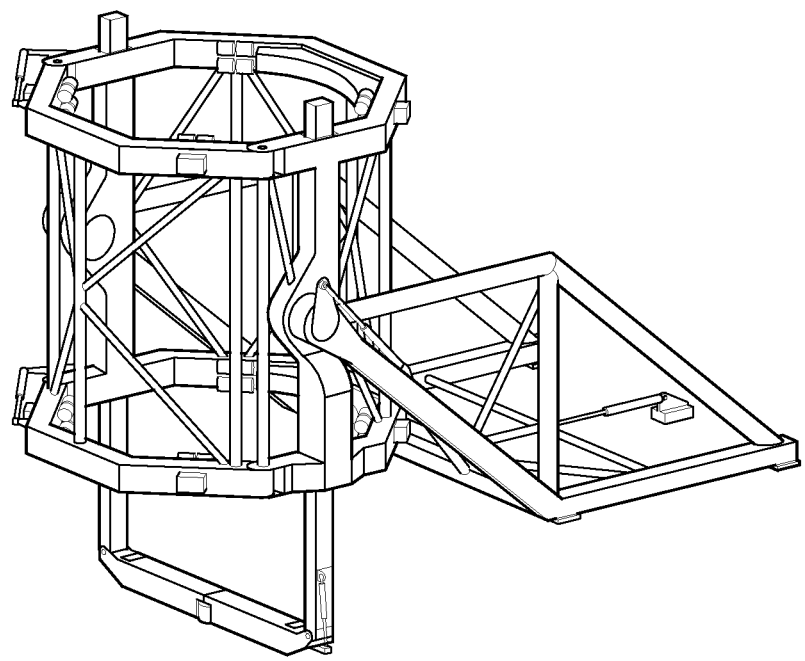
Figure 3F:
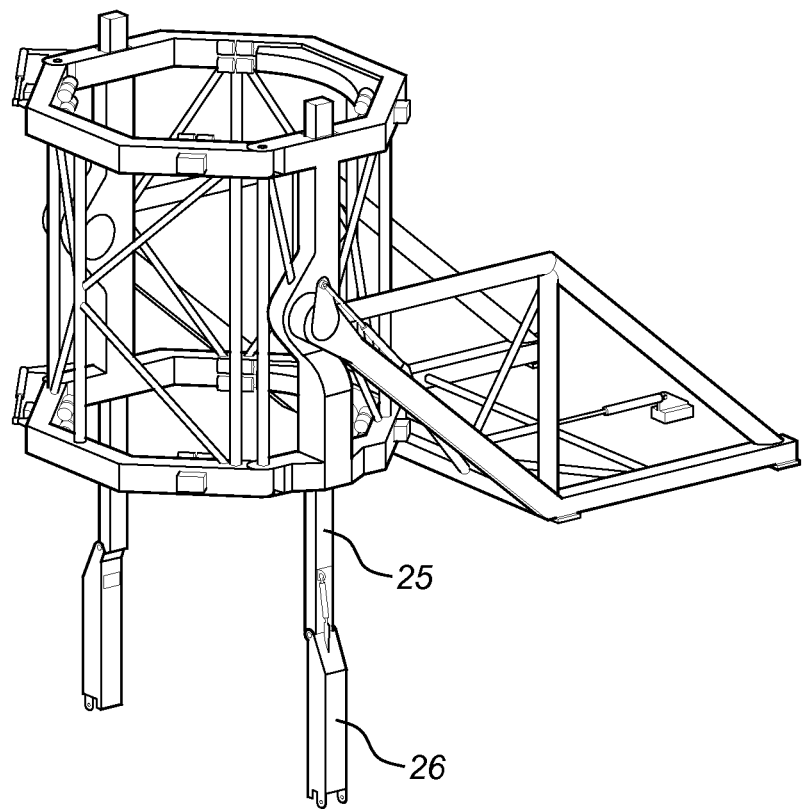

The upending tool is further equipped with means for supporting the lower end 4c of the monopile 4 in a suspended position. These means may comprise telescopically extendable arms 25 extending in the longitudinal direction 40 of the monopile 4 and provided with hooks 26 extending in a plane transverse to the longitudinal direction 40 and able to engage the lower end 4c, as shown in FIG. 2 for instance. Referring to FIG. 3F, the hooks 26 may be pivoted around and end part of the arms 25 to a position that releases the lower end 4c of the monopile 4. They may for instance be opened by hydraulic cylinders. FIGS. 3C and 3D illustrate that the length of the arms 25 may be adjusted telescopically to accommodate different monopile sizes. The telescopic hooks 26 may in other words be adjusted to accommodate different stick-through lengths of the monopile. For upending, the hooks 26 may be mechanically locked. The telescopic hooks 26 are used to constrain the bottom end part 4c of the monopile 4 during upending. The telescopic hooks 26 are each operated by a skidding cylinder and two locking cylinders, not shown in detail.

The purpose of the upending tool 2 is to support and constrain the bottom end part 4c of the monopile 4 during upending. After upending of the monopile 4, the pile 4 is typically caught by the gripping tool 3 where after the upending tool 2 cage-like structure (20, 21, 22) is opened and the monopile 4 is released. After releasing the monopile 4, the upending tool 2 may be returned to its inboard position by skidding it inboards along the pair of skidding rails 210.

Figure 4A:
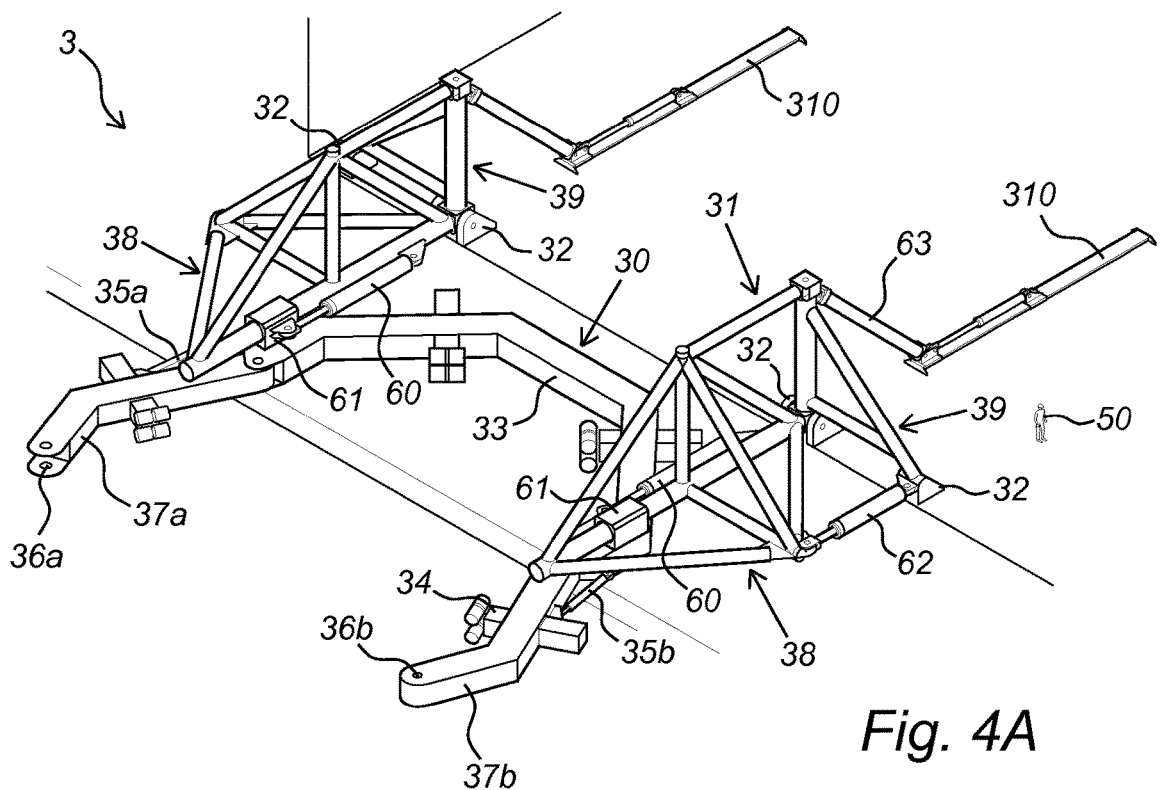
FIG. 4A-4C are schematic perspective views of a gripping tool according to an embodiment of the invention.
Figure 4B:
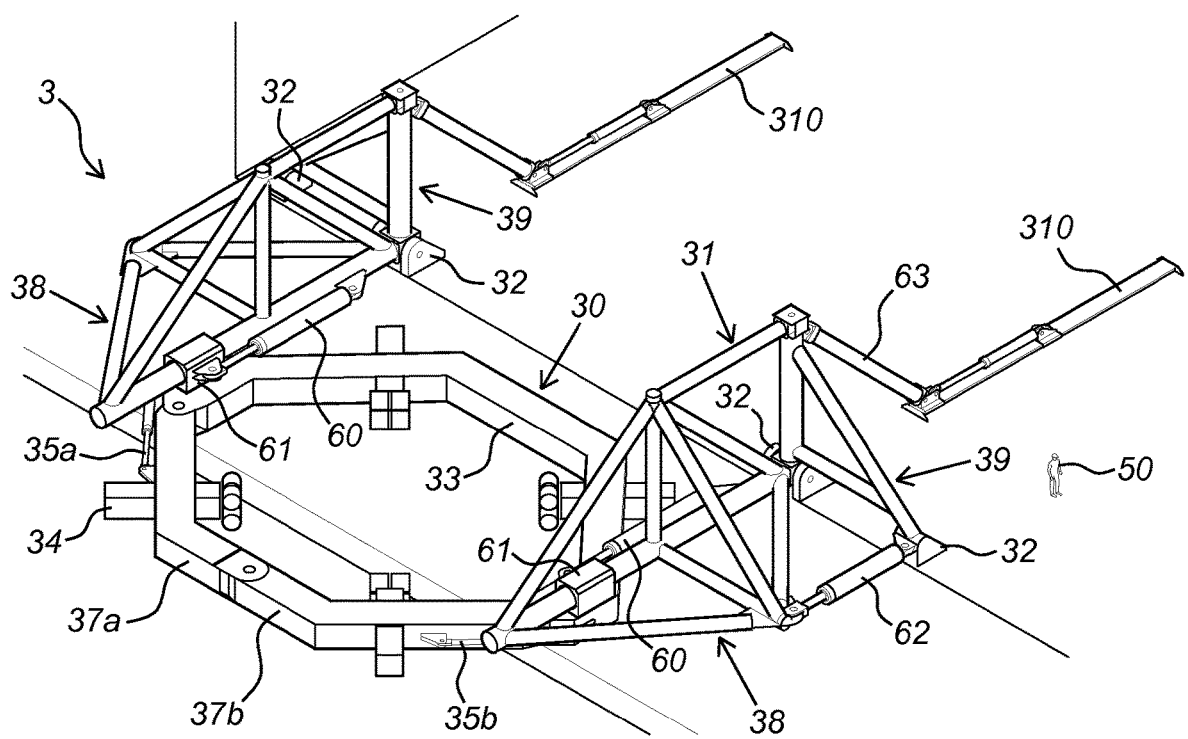
Figure 4C:
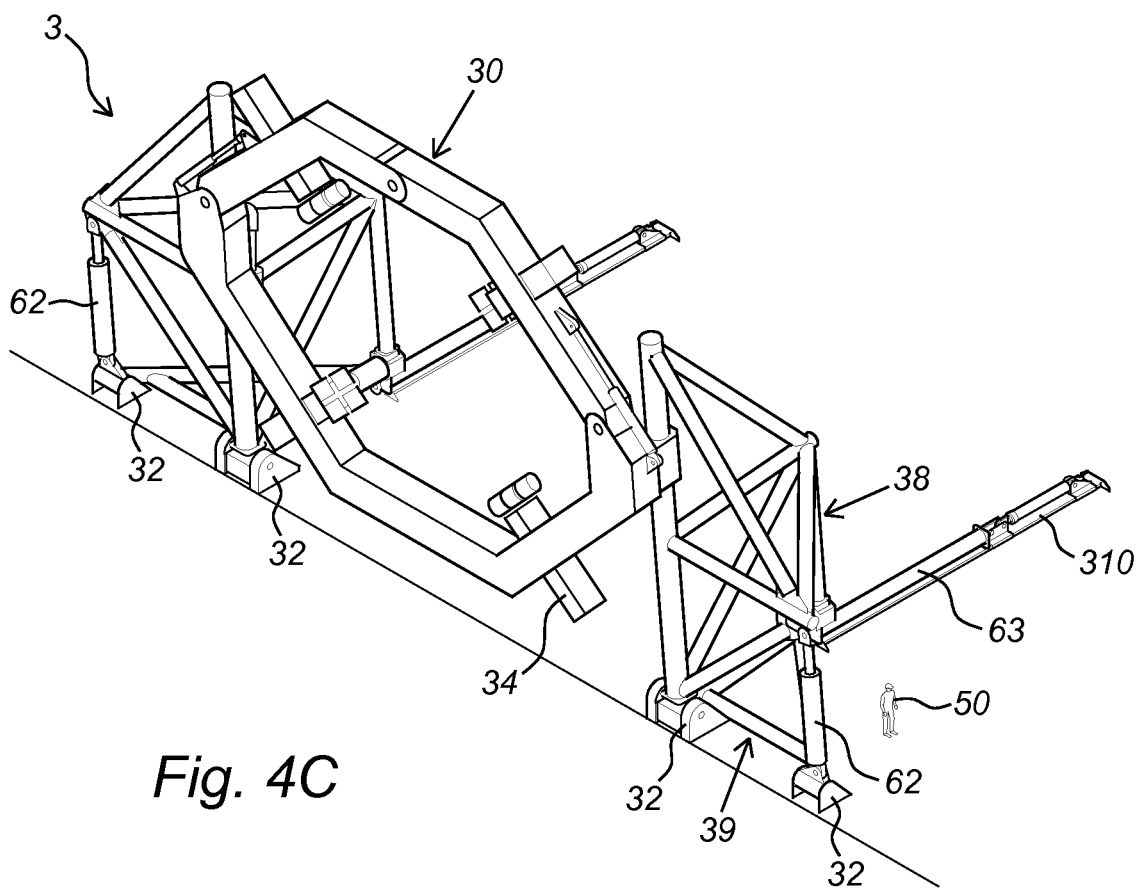

With reference to FIGS. 4A and 4B, an embodiment of a gripping tool 3 is shown. The gripping tool 3 comprises a gripping unit 30 for engaging the second circumferential part 4b of a monopile 4, and a support frame 31 for the gripping unit 30. The support frame 31 is pivotably connected to the edge 10a of the vessel 10 by a number of hinges 32, provided on the work deck 10b of the vessel 10 and allowing a rotation around an axis extending along the edge 10a. Such a connection allows moving the gripping tool 3 between an inboard position, as shown in FIG. 4C, to an outboard position, as shown in FIG. 4B.

The support frame 31 further comprises a number of braces forming a sliding frame 38 and a folding frame 39. The sliding frame 38 aims at keeping the gripping unit 30 in place. During compensation, the gripping unit 30 is sliding over the sliding frame 38 by activating the hydraulic cylinders 60 that extend between the sliding frame 38 and sliding interfaces 61, provided on the gripping unit 30. The sliding frame 38 is connected to the folding frame 39 with hinges 32 and can move relative to the folding frame 39 by actuation of hydraulic cylinders 62. The folding frame 39 is used to position the sliding frame 38 outboard during operation. The folding frame 38 is thereto connected to the work deck 10a by hinges 32. The folding frame 38 can also be folded onto the work deck 10a with the use of the skidding system 310 of the gripping tool 3, as shown in FIG. 4C. The folding frame 38 is lowered by skidding a brace 63 provided between the folding frame 38 and the skidding rails 310 backwards.

The gripping unit 30 is formed as a guiding ring comprising a main frame element 33 and hingedly connected thereto two frame arm elements (37a, 37b) that are locked into position after a monopile 4 has been loaded inside the gripping unit 30. The arm elements (37a, 37b) of the guiding ring are actuated by hydraulic cylinders (35a, 35b) provided between the main frame element 33 and the arms (37a, 37b) respectively. The arm elements (37a, 37b) may be locked by a pin, provided through holes (36a, 36b) in arms (37a, 37b), and for instance inserted by a hydraulic cylinder.

As with the upending tool 2, the main frame element 33 and the arms (37a, 37b) are provided with a plurality of guiding arms 34, provided along the circumference of the gripping unit 30 and extending in a transverse plane about perpendicular to the longitudinal direction 40 of a monopile 4 provided in the gripping unit 30. The guiding arms 34 may be the same as the guiding arms 24 that have been described above with reference to FIG. 5. The guiding arms 34 (also referred to as roller boxes) are used to keep the monopile 4 in a centered position within the gripping unit 30. The hydraulic cylinder is placed inside the roller boxes to adjust the support diameter in the gripping unit 30 by pushing out or retracting the rollers 34a. An additional (horizontal) orientation roller 34b may be pushed against the monopile 4 to place the monopile in a desired orientation with respect to a vertical (yaw) axis. While there are four rollers drawn in FIG. 4, the total number of rollers can be chosen at will and may be more then four, for instance six or eight, or even more, depending on the need for support of the monopile 4.

The actuator system comprises at least the hydraulic piston cylinder units (60, 62), and preferably also the hydraulic cylinders 29a, suitably incorporated in a hydraulic circuit (not shown). The hydraulic cylinders 62 allow translating the gripping unit 30, and therefore also a second circumferential part 4b of an upended monopile 4 provided in the guiding unit 30, relative to the vessel 10 in a substantially horizontal plane, thereby compensating for vessel motions in this plane. The translation in the x and y direction is caused by a rotation around hinge 32. This is because the gripping tool 3 is pivotably connected to the edge 10a of the vessel 10 around an axis extending perpendicular to the deck 10b of the vessel 10. A horizontal plane is defined as extending substantially parallel to the underwater bottom, or alternatively to the water surface.

The hydraulic piston cylinder units (60, 62) may be provided with throttle means for hydraulic liquid present in the piston cylinder, thereby allowing to act as movement-damping means configured to damp movements of the gripping tool 3 relative to the vessel 10. They may optionally be cooled.

The actuator system at least comprising the hydraulic piston cylinder units (60, 62) may be configured to hold the second circumferential part 4b of the upended monopile 4 in a substantially fixed position relative to the underwater bottom in a horizontal plane, i.e. in a plane extending parallel to the underwater bottom. This may be achieved by translating the gripping tool 3 relative to the vessel 10 in said horizontal plane by the actuator system. Thereto, a sensor system (not shown but known per se) configured to measure an inclination of the upended monopile 4 relative to a vertical axis is provided and the sensor system output is used to generate control signals for the actuator system in order to keep the inclination angle within a tolerable deviation from the vertical direction. Angle measurement systems such as inclinometers are known per se and any suitable type may be used. It is also possible and preferred to measure the inclination angle by other means than an inclinometer. It is for instance possible to derive the inclination of the object by a position measurement of the top and bottom ends of the object and derive the inclination from these two positions determined relative to the underwater bottom.

The device may further be equipped with means for driving the upended monopile 4 into the underwater bottom, such as a hydraulic hammering unit. A noise mitigation system (NMS) may also be used, preferably attached to the gripping unit.

The invented device 1 may be used advantageously in a method for providing a monopile 4 into an underwater bottom from a deck of a floating vessel 10.

Figure 6A:
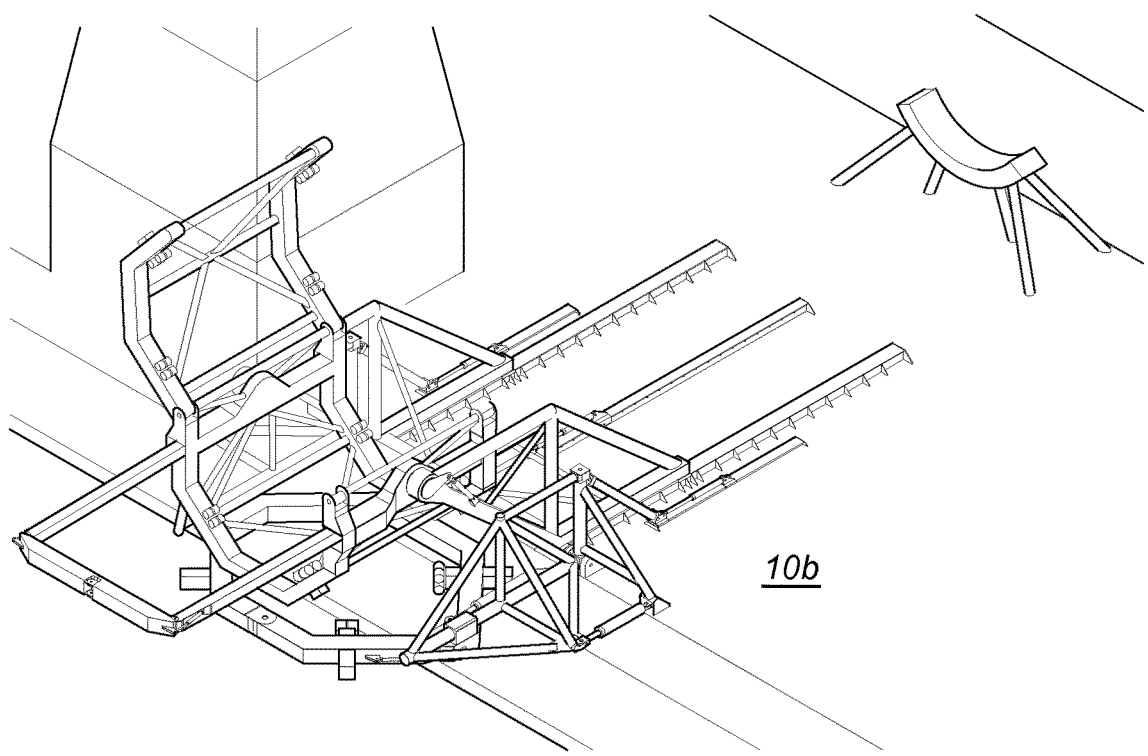
Figure 6B:
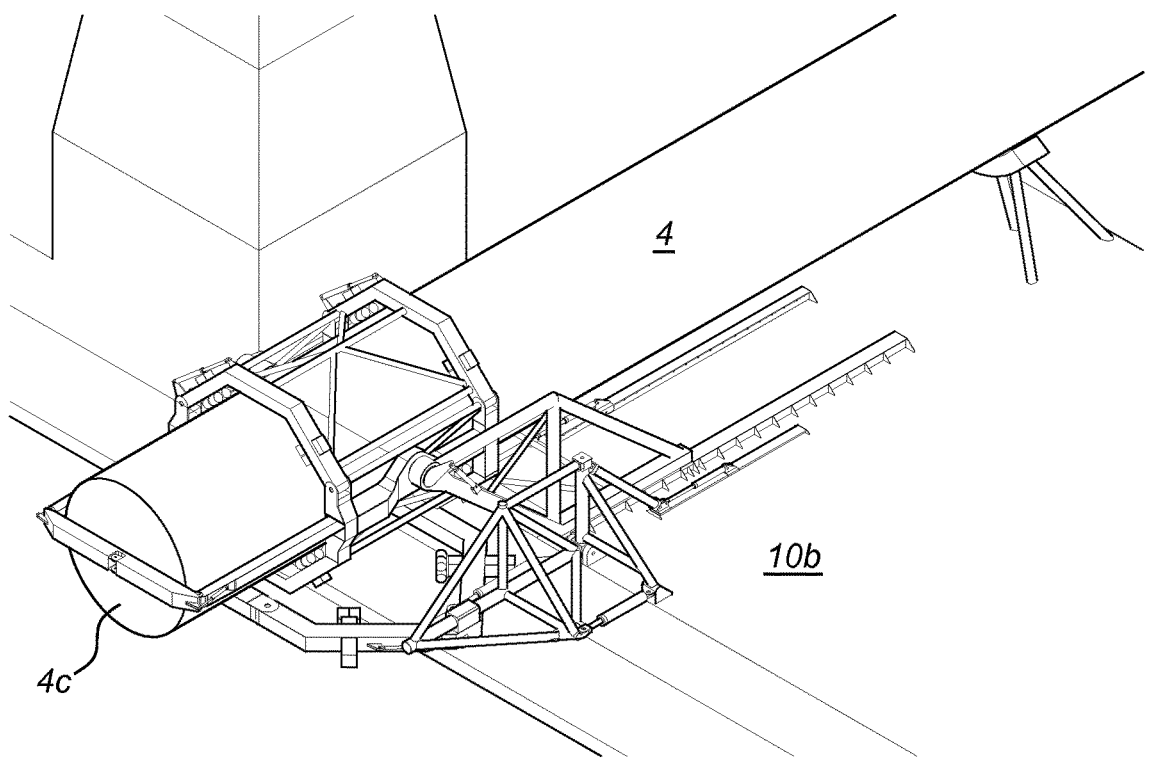
Figure 6C:
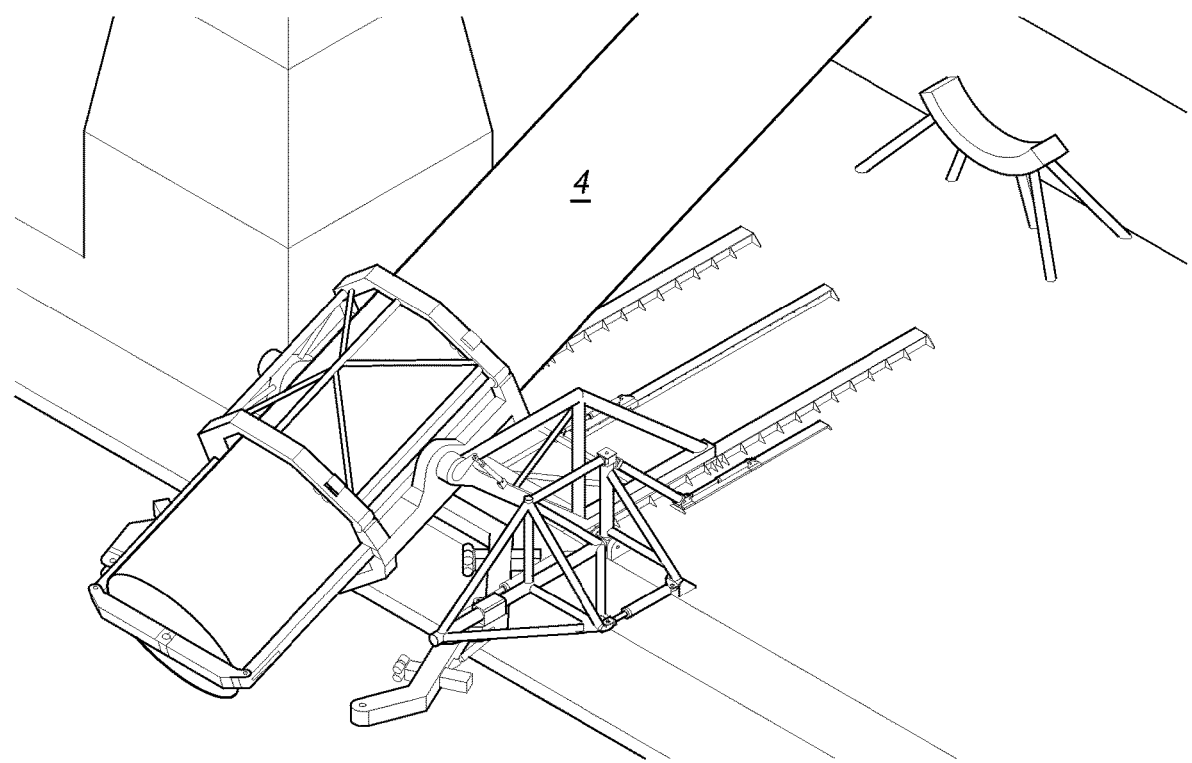
Figure 6D:
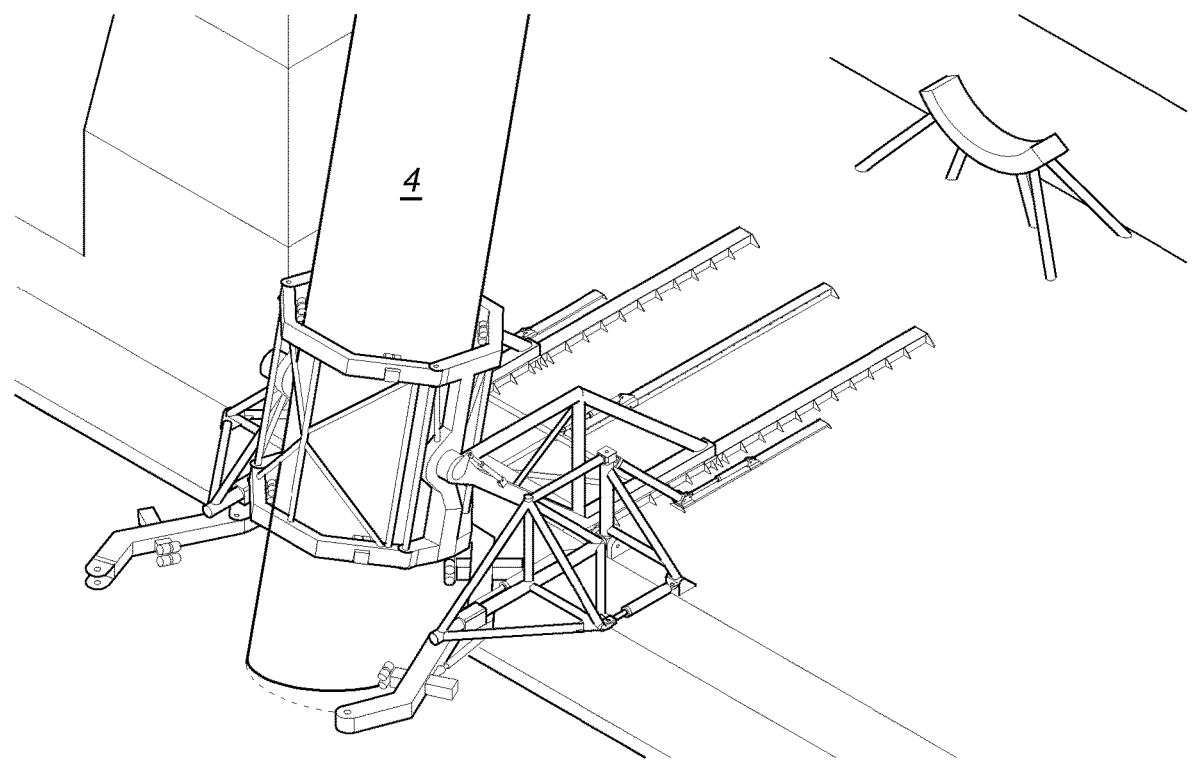
Figure 6E:
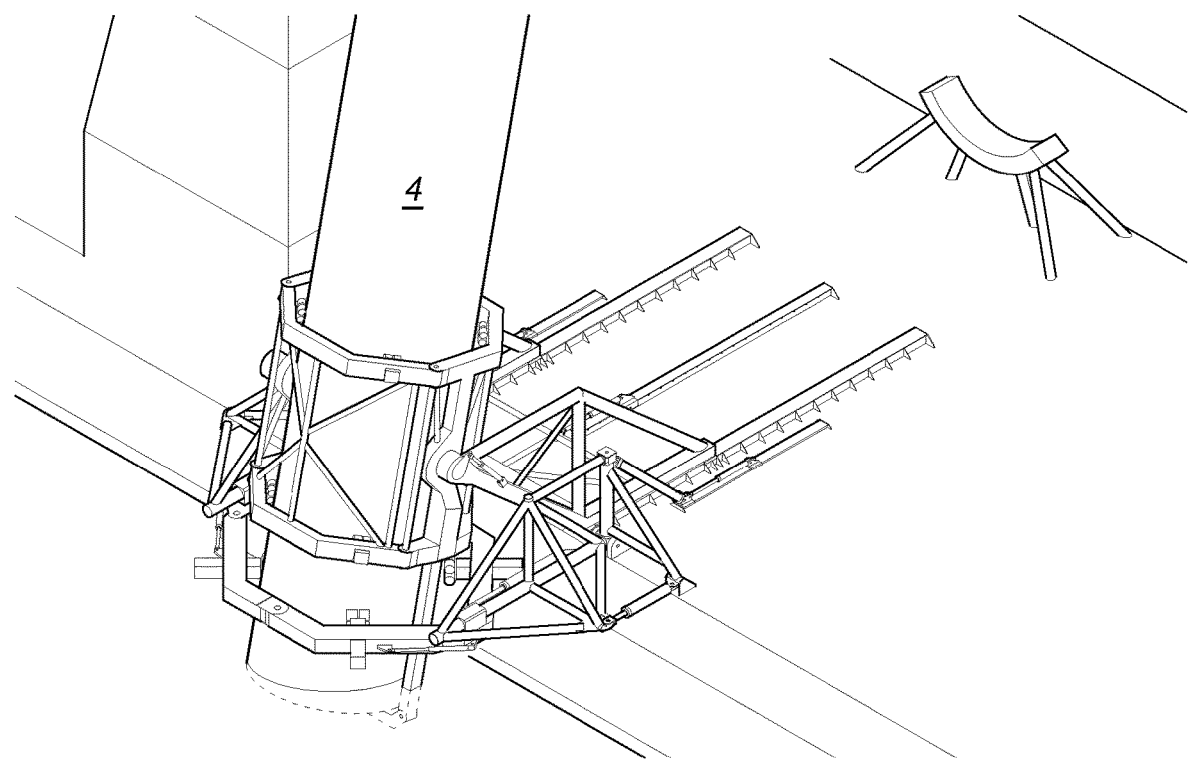
Figure 6F:
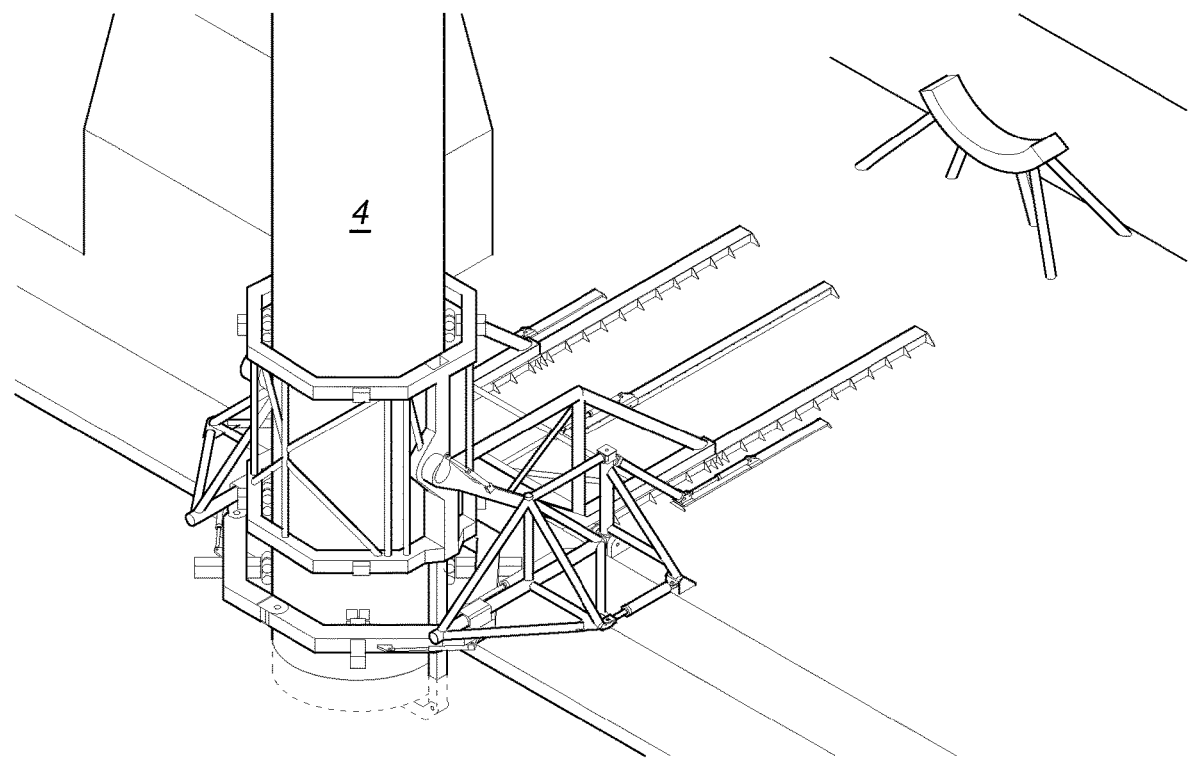
Figure 6G:
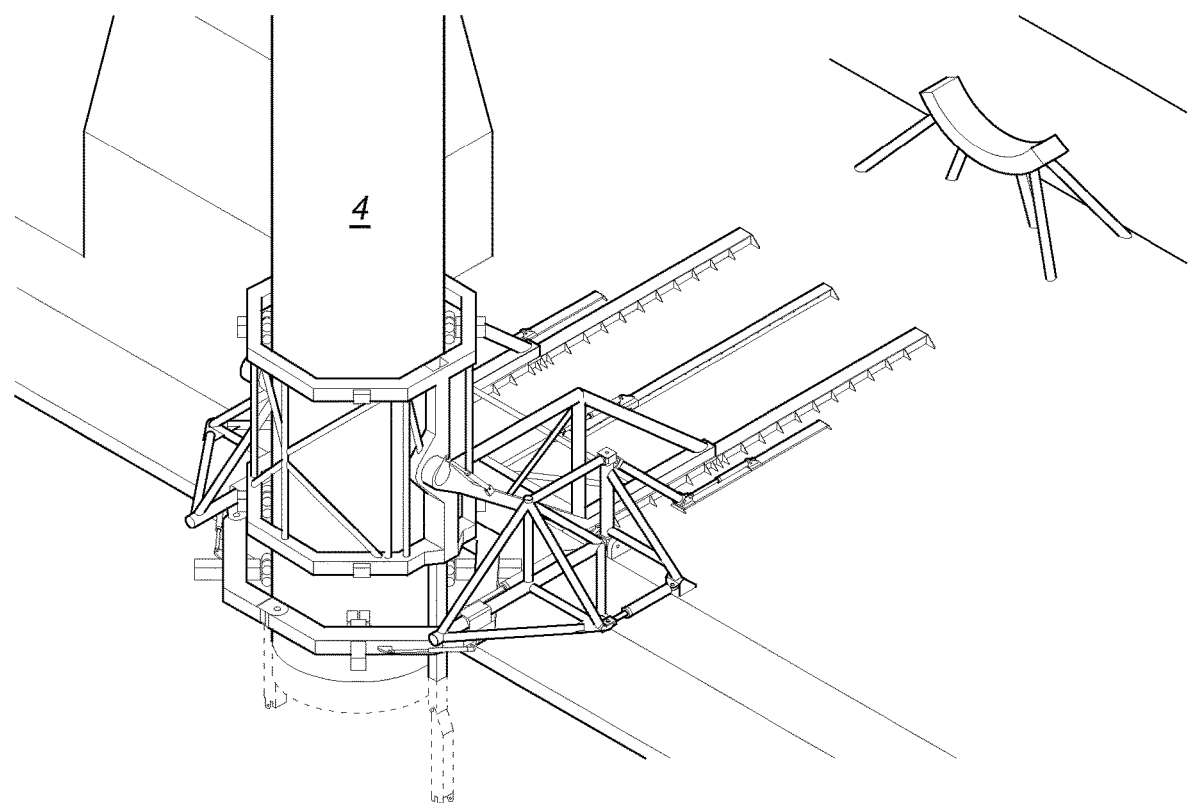
Figure 6H:
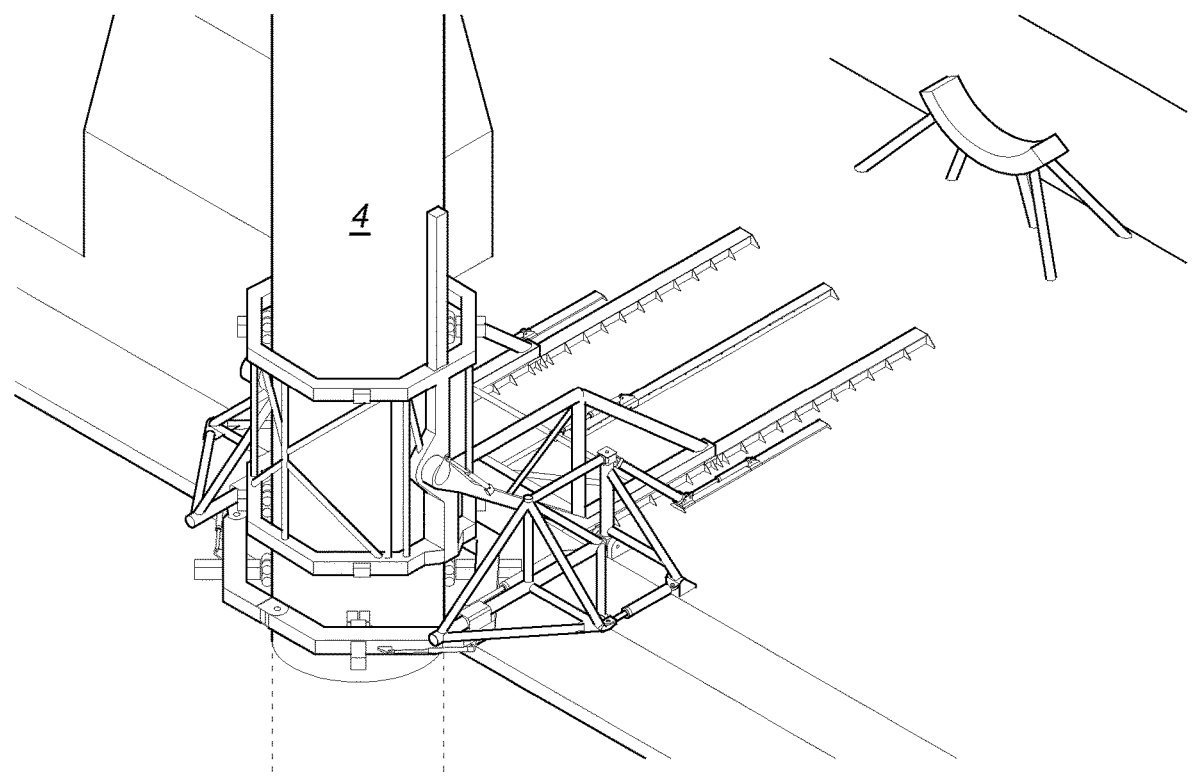
Figure 6I:
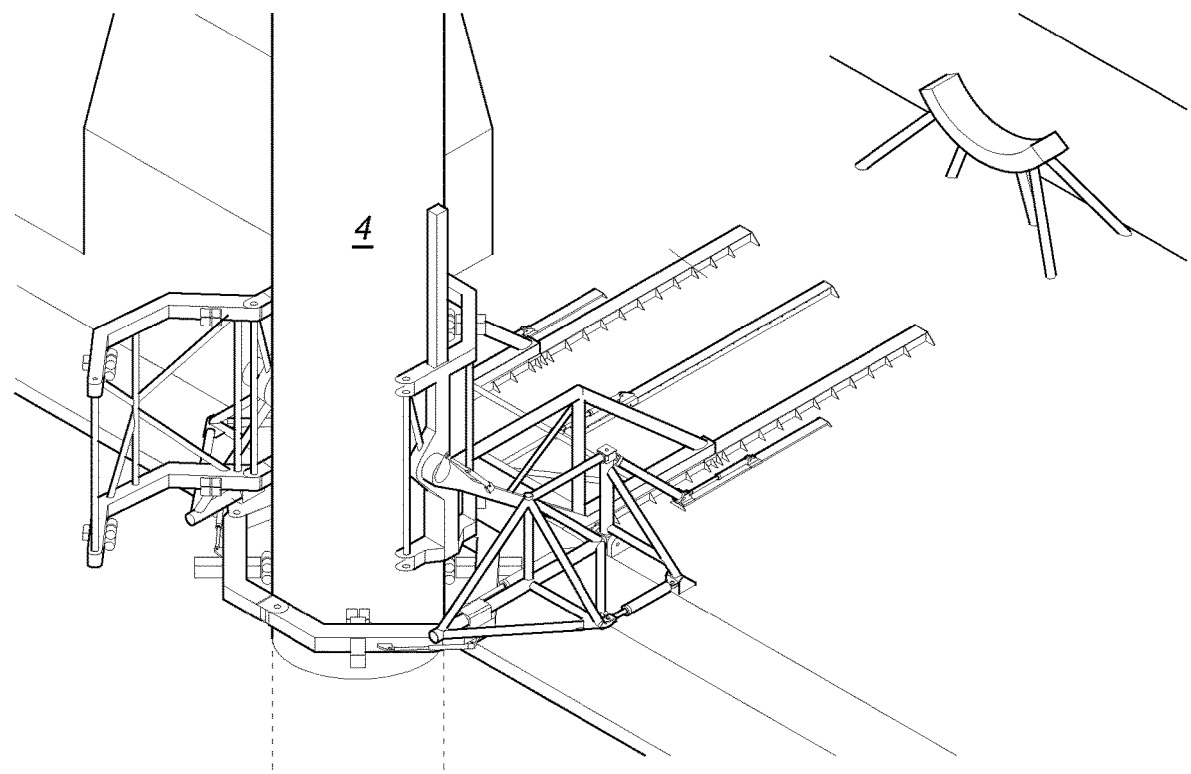
Figure 6J:
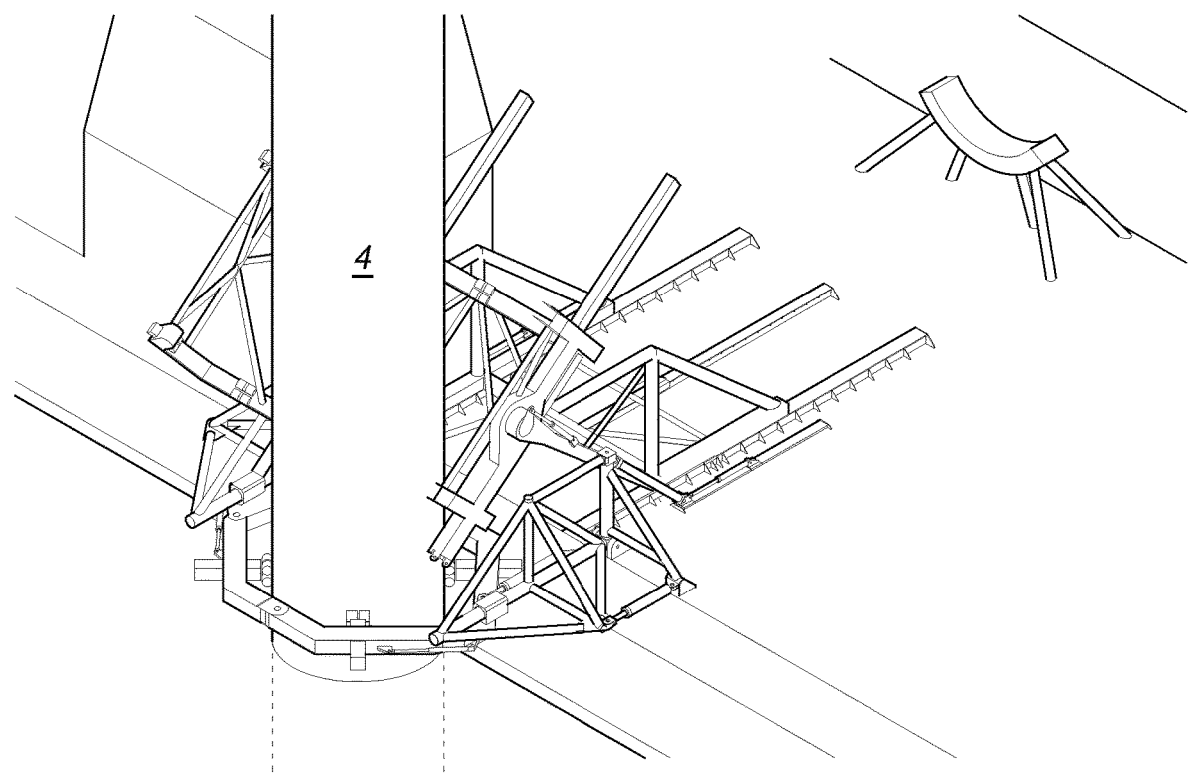
Figure 6K:
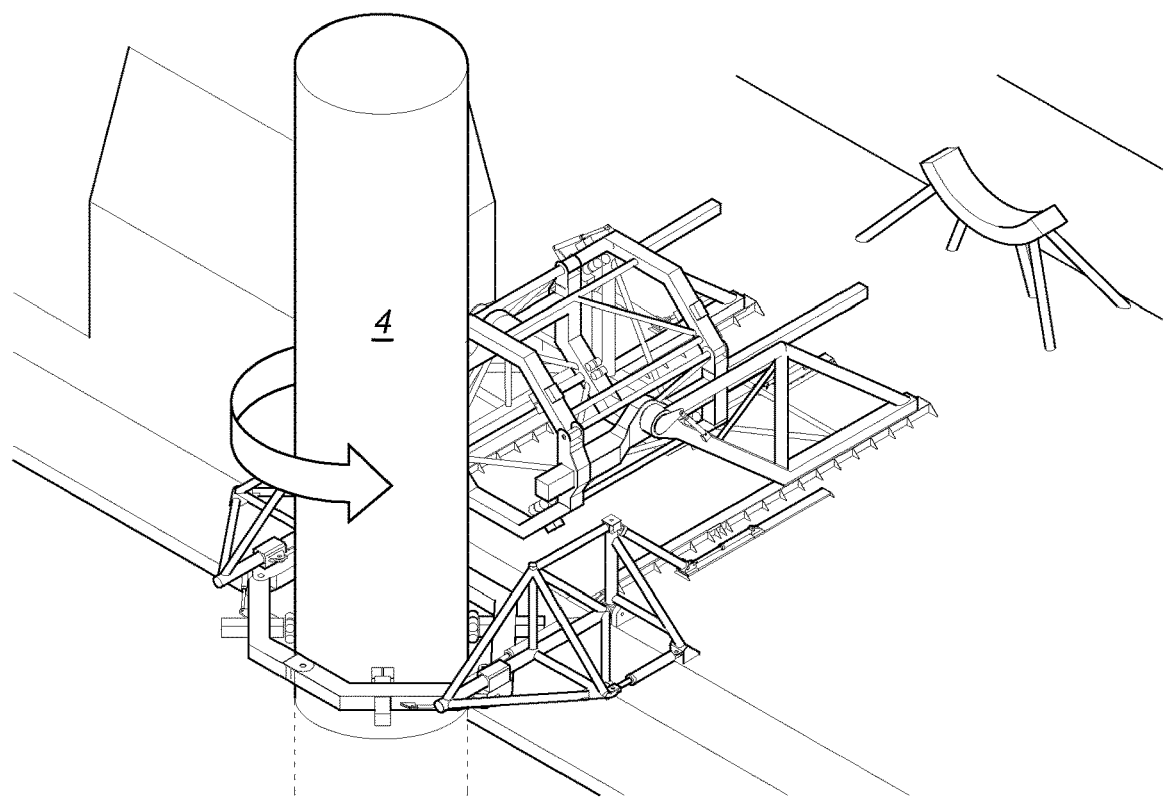
Figure 6L:
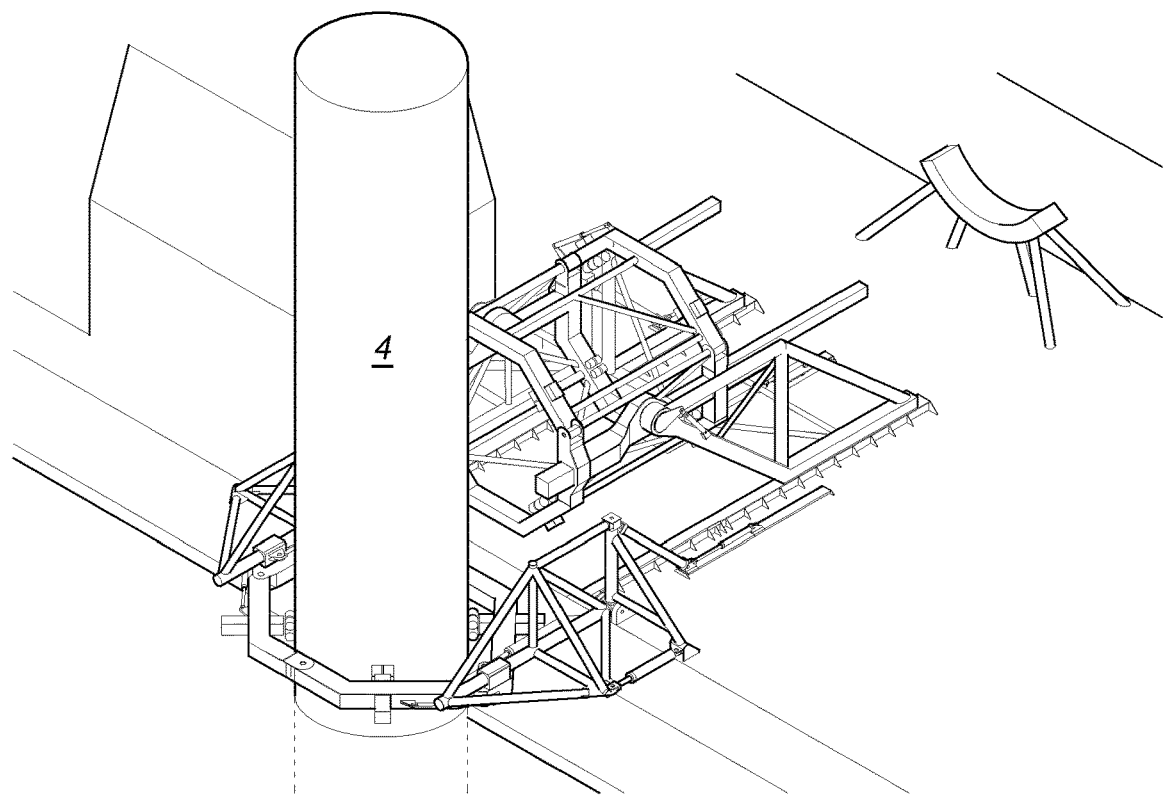
Figure 6M:
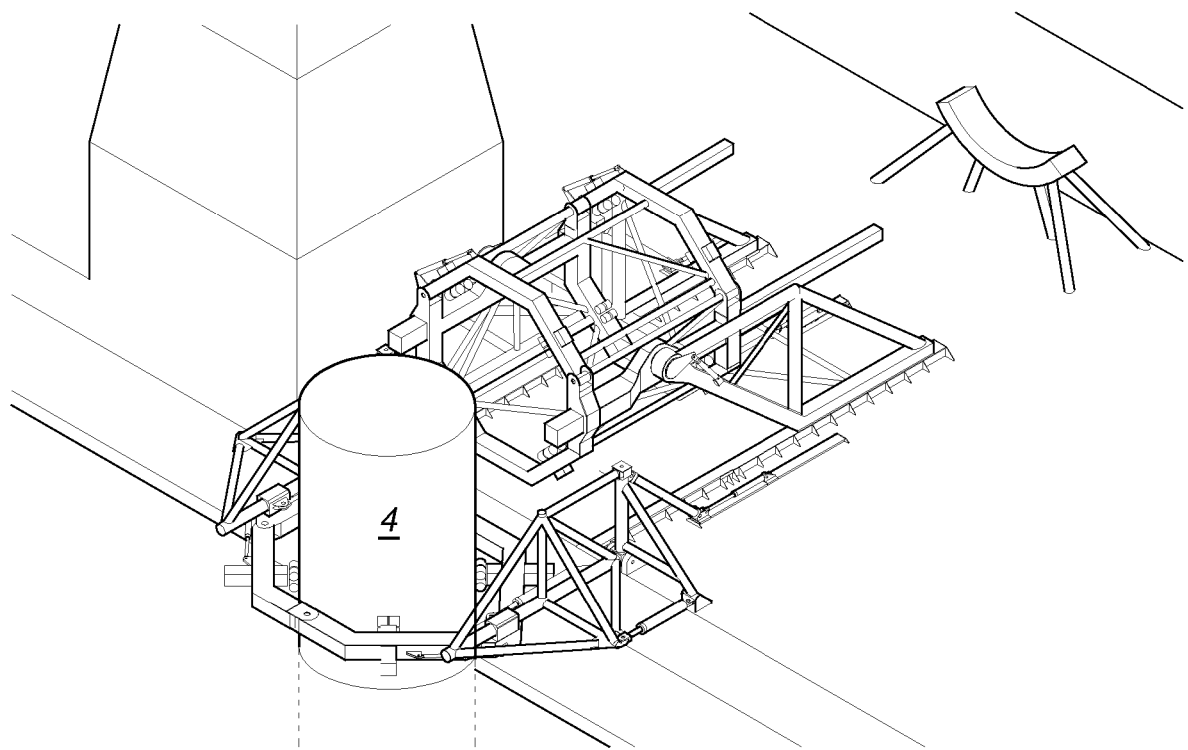
Figure 6N:
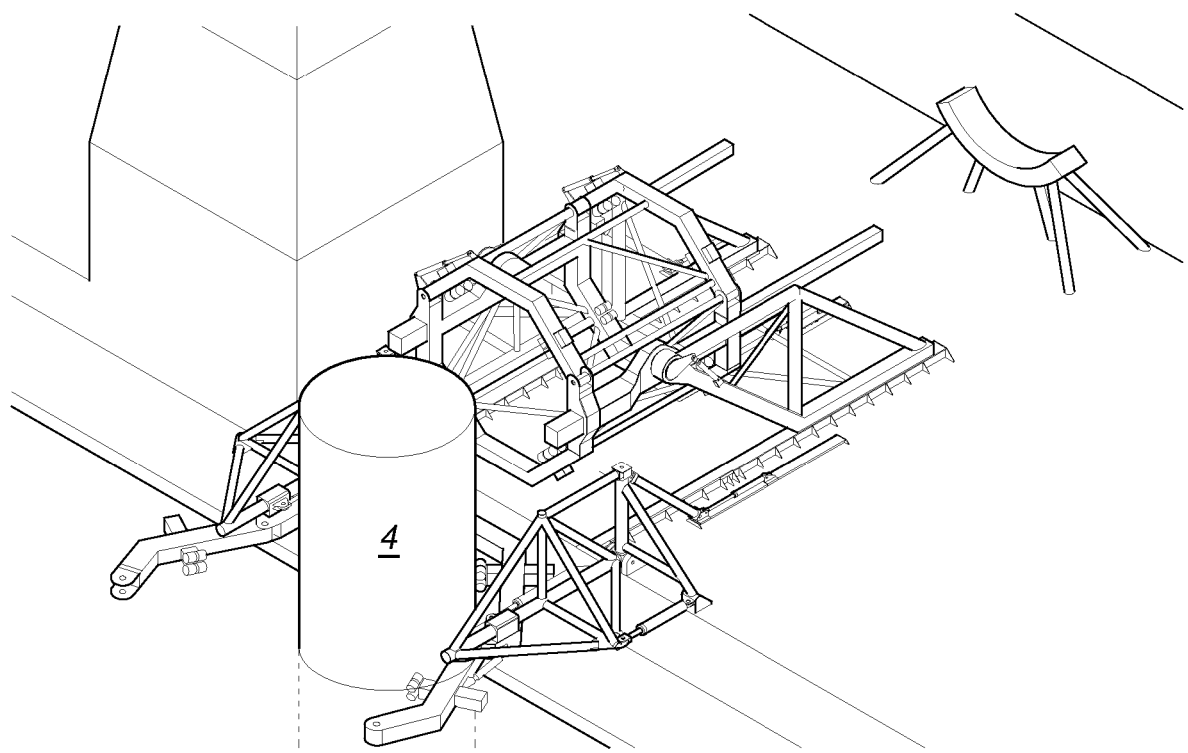
Figure 6O:
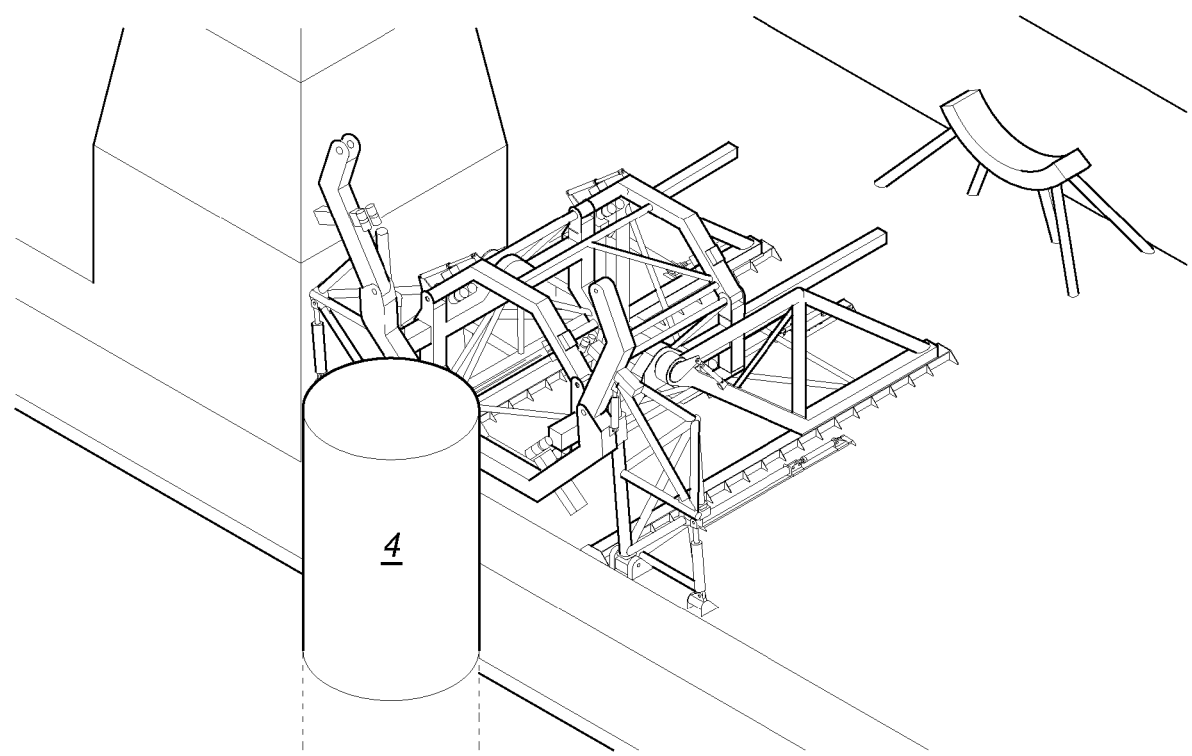

Referring to FIGS. 6A to 6O, the method may comprise several steps. These may typically be as follows.

In a first step the cage of the upending tool 2 is opened and prepared for loading of a monopile 4 (FIG. 6A). The cage of the upending tool 2 is in this stage oriented substantially horizontally. The telescopically extendable arms 25 extend in the longitudinal direction 40 of the monopile 4 and the hooks 26 configured to support the lower end 4c of the monopile 4 are closed.

A monopile 4 is then taken up by the lifting means in the form of crane 7 and loaded inside the upending tool 2, until its lower end face 4c reaches the closed hooks 26. Alternatively, the hooks 26 may be brought towards the lower end face 4c after the monopile 4 has been loaded inside the upending tool 2. The cage of the upending tool 2 is closed to load and hold the monopile 4 within the cage of the upending tool 2 (FIG. 6B). The monopile 4 is oriented in a substantially horizontal position, about parallel to the work deck 10b of the vessel 10.

As shown in FIG. 6C, the gripping unit 30 of the gripping tool 3 is opened by rotating the arms (37a, 37b) outwardly and the monopile 4 is upended by the crane 7. This also causes a free rotation of the upending tool 2 around its pivot 29 which connects via 28 to the vessel 10. Opening of the gripping tool 3 is required in this embodiment in order to let the monopile 4 pass the gripping unit 3.

The monopile 4 is upended with the crane 7 and the upending tool 2 until a certain angle of inclination is reached, which is relatively close to the vertical direction (FIG. 6D).

In order for the monopile 4 to approach a substantially vertical direction, the gripping unit 30 of the gripping tool 3 is closed by rotating the arms (37a, 37b) around a second circumferential part 4b of the monopile 4, as shown in FIG. 6E.

The monopile 4 is further upended until it is positioned in a substantially vertical position, as shown in FIG. 6F. The gripping unit 30 of the gripping tool 3 provides additional stability during this last stage of upending.

FIG. 6G illustrates a next step in which the telescopic hooks 26 are opened to clear the monopile 4 from the upending tool 2, at least in a vertical direction about parallel to the z-axis. The monopile 4 is now solely suspended in the crane 7.

The telescopic arms 25 with hooks 26 are retracted within the cage of the upending tool 2 and the monopile 4 is further lowered, guidance being provided by both the gripping unit 3 and the upending tool 2, of which the cage is still closed around the monopile 4 (FIG. 6H).

After lowering of the monopile 4 to a position just above the underwater bottom surface, the cage of the upending tool 2 is opened to release the monopile 4 at least from the upending tool 2. This step is shown in FIG. 6I.

Referring now to FIG. 6J, the upending tool 2 is rotated around its hinged connection with the vessel 10 towards the work deck 10b and translated along the skidding rails 210 to a rest position on deck of the vessel 10.

The monopile 4 is then oriented around its longitudinal axis 40 by using the rollers 34b of roller boxes 34 in a direction of the yaw arrow prior to stabbing it into the underwater bottom, as shown in FIG. 6K. The gripping unit 30 of the gripping tool 3 obviously is still provided around the monopile 4 in order for the rollers 34b to contact the surface of the monopile 4 in the second circumferential part 4b.

Referring to FIG. 6L, the monopile 4 is then further driven into the underwater bottom, preferably under its own weight, until the contact point with the bottom forms a hinge for the monopile 4. In this position, the actuator system and the hydraulic piston cylinders (60, 62) in particular become active by translating the gripping unit 30 and the second circumferential part 4b caught by this unit in a horizontal plane in order to bring and keep the monopile 4 in a substantially vertical position during penetrating the underwater bottom further. The actuator system preferably operates in response to signals originating from the output of an inclination or position sensor. The actuator system is operational in keeping the second circumferential part 4b of the monopile 4 in a stable position relative to the underwater bottom, thereby compensating vessel movements in the horizontal plane. The target position of the lower end 4c of the monopile 4 may be determined by measuring the position of the vessel 10 with the dynamic positioning system, the position of the crane 7, and the position of the gripping unit 30.

In a next phase, shown in FIG. 6M, the monopile 4 is hammered into the seabed while the gripping tool 3 and the actuator system continues its motion compensating operation.

When the monopile 4 has penetrated the underwater bottom to its desired extent, the hammering is discontinued and the gripping tool 3 opened by retracting the arms (37a, 37b), as shown in FIG. 6N. The gripping tool 3 may also be opened when the hammer is about to reach the height level of the gripping tool 3. In this situation, the monopile 4 will usually be stable enough for it to be unsupported by the gripping tool 3, even though it has not reached its final desired penetration depth.

The gripping unit 3 is ten brought to its rest position by rotating it towards the vessel's work deck 10a until it reaches an approximate vertical position (FIG. 6O). The vessel 10 can then be sailed to another location and the above described steps may be repeated to provide another monopile 4 into the underwater bottom.

The invention is not limited to the above described embodiment and also comprises modifications thereof, to the extent that these fall within the scope of the claims appended below.

The invention claimed is:

1. A device for providing a slender object having a longitudinal direction into an underwater bottom from a deck of a vessel, the device comprising:
   a lifting means configured to take up the object at a lifting point thereof and position it on the underwater bottom;
   an upending tool connected to an edge of the vessel and configured to engage a first circumferential part and support the object in the longitudinal direction when suspended from the lifting means, thereby providing a pivot around which the object can be upended;
   a gripping tool connected to an edge of the vessel and configured to engage a second circumferential part of the object suspended from the lifting means, and wherein the first and second circumferential parts are spaced apart in the longitudinal direction of the object; and
   an actuator system configured to act on at least one of the upending tool and the gripping tool and control movements of at least one of the first and the second circumferential parts, relative to the vessel, wherein the actuator system is configured to act on the gripping tool and translate the second circumferential part of the upended object relative to the vessel in both directions of a substantially horizontal plane, thereby compensating for vessel motions including sway and excluding heave, such that the second circumferential part of the upended object is held in a substantially fixed position relative to the underwater bottom in the substantially horizontal plane.

2. The device according to claim 1, whereby the first and second circumferential parts are spaced apart in the longitudinal direction of the object.

3. The device according to claim 1, wherein the actuator system is configured to hold the second circumferential part of the upended object in a substantially fixed position relative to the underwater bottom in a horizontal plane (in a plane extending parallel to the underwater bottom).

4. The device according to claim 1, further comprising a sensor system configured to measure an inclination of the upended object relative to a vertical axis and further comprising a control system configured to generate control signals for the actuator system in response to the sensor system output.

5. The device according to claim 1, wherein the vessel is a floating vessel and comprises a dynamic positioning (DP) or mooring system.

6. The device according to claim 1, wherein the gripping tool comprises a gripping unit for engaging the second circumferential part and a support frame for the gripping unit, wherein the support frame is connected to the edge of the vessel.

7. The device according to claim 1, wherein at least one of the upending tool and the gripping tool is pivotably connected to the edge of the vessel around an axis extending along the edge for bringing the tool inboard and outboard of the vessel.

8. The device according to claim 1, wherein the gripping tool is pivotably connected to the edge of the vessel around an axis extending perpendicular to the deck of the vessel.

9. The device according to claim 1, wherein the actuator system comprises piston cylinder units acting between the vessel and at least one of the upending tool and the gripping tool.

10. The device according to claim 1, wherein at least one of the upending tool and the gripping tool comprises an openable and re-closable ring structure provided around the first and/or second circumferential part of the object.

11. The device according to claim 10, wherein the ring structure is provided with a plurality of guiding arms, extending in a transverse plane about perpendicular to the longitudinal direction of the object, and movable in the transverse plane between a retracted position at a distance from the circumferential part, and an extended position in which the circumferential part is engaged.

12. The device according to claim 11, wherein the upending tool comprises two interconnected ring structures spaced apart in the longitudinal direction of the object, to form a cage-like structure.

13. The device according to claim 1, wherein the upending tool has means for supporting a lower end of the object suspended from the lifting means comprising telescopically extendable arms provided with hooks that engage the lower end.

14. The device according to claim 1, wherein the object comprises a monopile of a wind turbine.

15. The method for providing a slender object having a longitudinal direction into an underwater bottom from a deck of a vessel, the method comprising the steps of
 a) providing an object and a device according to claim 1;
 b) taking up the object with the lifting means at a lifting point thereof;
 c) bringing the object inside the upending tool and engaging a first circumferential part of the object suspended from the lifting means with the upending tool;
 d) upending the object to a substantially vertical position, while the upending tool is rotated around a pivot;
 e) engaging a second circumferential part of the object suspended from the lifting means with the gripping tool, whereby the first and second circumferential parts are spaced apart in the longitudinal direction of the object;
 f) lowering the object onto and into the underwater bottom; and
 g) decoupling the object from the device,
 wherein the actuator system acts on at least one of the upending tool and the gripping tool and controls movements of at least one of the first and the second circumferential parts, relative to the vessel during at least one of steps d) and f), and
 wherein step f) further comprises lowering the object onto and into the underwater bottom while the actuator system acts on the gripping tool and translates the second circumferential part of the upended object relative to the vessel in a substantially horizontal plane, thereby compensating for vessel motions, including sway and excluding heave, such that the second circumferential part of the upended object is held in a substantially fixed position relative to the underwater bottom in the substantially horizontal plane, at least during lowering the object in step f).

16. The method according to claim 15, wherein the actuator system damps the movements of at least one of the first and the second circumferential parts, relative to the vessel, at least during one of steps d) and f).

17. The method according to claim 15, wherein the object is a monopile used to support a wind turbine.

18. The device according to claim 1, wherein the control at least comprises damping of the movements of the at least one of the first and the second circumferential parts, relative to the vessel.

19. The device according to claim 1, wherein the object is a monopile used to support a wind turbine.

* * * * *